US011525941B2

United States Patent
Rodney et al.

(10) Patent No.: US 11,525,941 B2
(45) Date of Patent: Dec. 13, 2022

(54) IN-SITU CALIBRATION OF BOREHOLE GRAVIMETERS

(71) Applicant: Halliburton Energy Services, Inc., Houston, TX (US)

(72) Inventors: Paul F. Rodney, Spring, TX (US); Daniel Joshua Stark, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 178 days.

(21) Appl. No.: 16/957,009

(22) PCT Filed: Mar. 28, 2018

(86) PCT No.: PCT/US2018/024900
§ 371 (c)(1),
(2) Date: Jun. 22, 2020

(87) PCT Pub. No.: WO2019/190504
PCT Pub. Date: Oct. 3, 2019

(65) Prior Publication Data
US 2021/0041595 A1    Feb. 11, 2021

(51) Int. Cl.
*G01V 13/00*    (2006.01)
*E21B 23/00*    (2006.01)
(Continued)

(52) U.S. Cl.
CPC .............. *G01V 13/00* (2013.01); *E21B 23/00* (2013.01); *E21B 47/12* (2013.01); *G01V 7/02* (2013.01); *E21B 49/00* (2013.01)

(58) Field of Classification Search
CPC .......... G01V 13/00; G01V 7/02; E21B 23/00; E21B 47/12; E21B 49/00
See application file for complete search history.

(56) References Cited

U.S. PATENT DOCUMENTS 3,120,622 A   2/1964   Dranetz et al.
3,241,355 A   3/1966   McLean
(Continued)

FOREIGN PATENT DOCUMENTS

CA    1330265       6/1994
CA    2766745       1/2018
WO    2013163656    10/2013

OTHER PUBLICATIONS

ISRWO International Search Report and Written Opinion for PCT/US2018/024900 dated Oct. 25, 2018.

*Primary Examiner* — Natalie Huls
*Assistant Examiner* — Sharad Timilsina
(74) *Attorney, Agent, or Firm* — Benjamin Ford; C. Tumey Law Group PLLC

(57) ABSTRACT

A method and system for in-sit calibration of a gravimeter. A method may comprise disposing a downhole tool in a borehole, wherein the downhole tool comprises the gravimeter attached to a linear actuator, recording a first set of measurements with the gravimeter while the linear actuator is stationary, activating the linear actuator, recording a second set of measurements with the gravimeter, and calibrating the gravimeter based on the first and second set of recorded measurements. A system may comprise a downhole tool, a conveyance, and an information handling system. The downhole tool may further comprise a hanger, a sonde, connected to the hanger, a linear actuator, connected to the hanger, and a shaft, connected to the linear actuator. The downhole tool may further comprise a linkage, connected to the shaft, a package, connected to the linkage, and a gravimeter, disposed in the package.

21 Claims, 11 Drawing Sheets

(51) Int. Cl.
*E21B 47/12* (2012.01)
*G01V 7/02* (2006.01)
*E21B 49/00* (2006.01)

(56) References Cited

U.S. PATENT DOCUMENTS

| | | | |
|---|---|---|---|
| 3,350,916 | A | 11/1967 | Block |
| 3,470,730 | A | 10/1969 | Fujitsubo et al. |
| 3,782,167 | A | 1/1974 | Stuelpnagel |
| 4,851,080 | A | 7/1989 | Howe et al. |
| 4,869,092 | A | 9/1989 | Bernard et al. |
| 5,253,510 | A | 10/1993 | Allen et al. |
| 5,806,194 | A | 9/1998 | Rodney et al. |
| 5,969,249 | A | 10/1999 | Roessig et al. |
| 6,640,609 | B1 | 11/2003 | Nadkarni et al. |
| 6,823,279 | B1 | 11/2004 | Nadkarni et al. |
| 6,966,211 | B2 | 11/2005 | Wu |
| 7,093,478 | B2 | 8/2006 | Chau et al. |
| 7,640,786 | B2 | 1/2010 | Stewart |
| 7,640,803 | B1 | 1/2010 | Gutierrez et al. |
| 7,835,880 | B2 | 11/2010 | Lou |
| 8,099,994 | B2 | 1/2012 | Stachow et al. |
| 8,136,383 | B2 | 3/2012 | Goujon et al. |
| 8,374,817 | B2 | 2/2013 | Boeve et al. |
| 8,548,766 | B2 | 10/2013 | Judd |
| 8,645,267 | B2 | 2/2014 | Tso |
| 8,718,963 | B2 | 5/2014 | An et al. |
| 9,003,862 | B2 | 4/2015 | Rodney et al. |
| 9,217,757 | B2 | 12/2015 | Hergesheimer et al. |
| 9,261,525 | B2 | 2/2016 | Thiruvenkatanathan et al. |
| 9,310,391 | B2 | 4/2016 | Seshia et al. |
| 9,459,276 | B2 | 10/2016 | Joseph |
| 9,551,576 | B2 | 1/2017 | Thiruvenkatanathan et al. |
| 2003/0061859 | A1 | 4/2003 | Rothoff |
| 2006/0044939 | A1* | 3/2006 | Shah ............... E21B 47/16 367/82 |
| 2006/0059976 | A1 | 3/2006 | Simonenko et al. |
| 2008/0271533 | A1* | 11/2008 | Csutak ............ E21B 47/04 73/514.27 |
| 2010/0318257 | A1 | 12/2010 | Kalinadhabhotla |
| 2011/0077891 | A1 | 3/2011 | Koenig |
| 2011/0185806 | A1 | 8/2011 | Pfutzner |
| 2012/0123592 | A1* | 5/2012 | Carignan ............ A61F 2/70 700/275 |
| 2012/0215477 | A1 | 8/2012 | Tuck et al. |
| 2014/0007646 | A1* | 1/2014 | Rodney ............... G01V 3/18 73/1.01 |
| 2014/0060178 | A1 | 3/2014 | Wong et al. |
| 2014/0083186 | A1 | 3/2014 | Levitt et al. |
| 2014/0096587 | A1 | 4/2014 | Stewart et al. |
| 2014/0278191 | A1 | 9/2014 | Anderson |
| 2014/0372063 | A1 | 12/2014 | Niu et al. |
| 2015/0027779 | A1 | 1/2015 | Sugiura et al. |
| 2015/0033821 | A1 | 2/2015 | Mangano |
| 2015/0068772 | A1* | 3/2015 | Richards ............ E21B 47/092 166/386 |
| 2015/0107852 | A1* | 4/2015 | Southgate ........... E21B 23/00 166/66 |
| 2016/0091529 | A1 | 3/2016 | Dawson et al. |
| 2016/0123765 | A1 | 5/2016 | Wu et al. |
| 2016/0377650 | A1 | 12/2016 | Anderson et al. |
| 2019/0201002 | A1* | 7/2019 | Opriessnig ......... A61M 29/02 |

* cited by examiner

IN-SITU CALIBRATION OF BOREHOLE GRAVIMETERS

BACKGROUND

Wellbores drilled into subterranean formations may enable recovery of desirable fluids (e.g., hydrocarbons) using a number of different techniques. Knowing formation properties may help in locating and recovering desirable fluids. Borehole gravimetry makes it possible to measure formation densities at distances from a borehole that may exceed one hundred meters. These measurements may be tied in with surface gravimeter/gradiometer readings which may be applicable for oil/gas identification in regions beyond the range of most sensors, waterflood monitoring, bed dip and thickness calculations, optimization of well placement for enhanced oil recovery, and measurement of density behind casing. Gravimeters may be used to determine the accurate measurements of a gravitational field to locate horizontal and vertical variations in the density of subsurface rocks.

There has been an interest in borehole gravimetry for many decades, but for Logging While Drilling (LWD) it has not been practical due to the size of commercially available gravimeters, packaging constraints (shock, vibration and pressure housing), and temperature sensitivity of the devices. Gravimeters with the requisite sensitivity (in the range of one microgal) have recently become available through the use of MEMS technology (Micro Electro Mechanical Systems) and through the use of atom interferometry using ultracold atoms on an "atom chip". Due to temperature effects and intrinsic instability, these devices are expected to require frequent calibration when used downhole. In particular, this disclosure may relate to in situ calibration of gravimeters.

In a wireline or measuring while drilling environment, it is anticipated that the high levels of vibration and thermal cycling will lead to instabilities in the calibration of these devices. Calibrating a gravimeter in this environment may present challenges to overcome for in-situ calibration.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to an apparatus and system for borehole gravimetry and borehole surveying using gyroscopes. Currently, borehole gravimetry may be utilized in wireline, Measurement While Drilling ("MWD") and/or Logging While Drilling ("LWD") operations. One type of borehole gravimeters may be based on MEMS (Micro Electro Mechanical Systems) devices. As disclosed below, it should be possible to incorporate a borehole gravimeter such as the MEMS gravimeter developed by Silicon Micro Gravity (SMG) to services in a real time while-drilling environment or a wireline environment. These devices may be adapted to provide survey grade gyroscopes. Some of the techniques disclosed herein are also applicable to the calibration of such gyroscopes.

Figure 1:
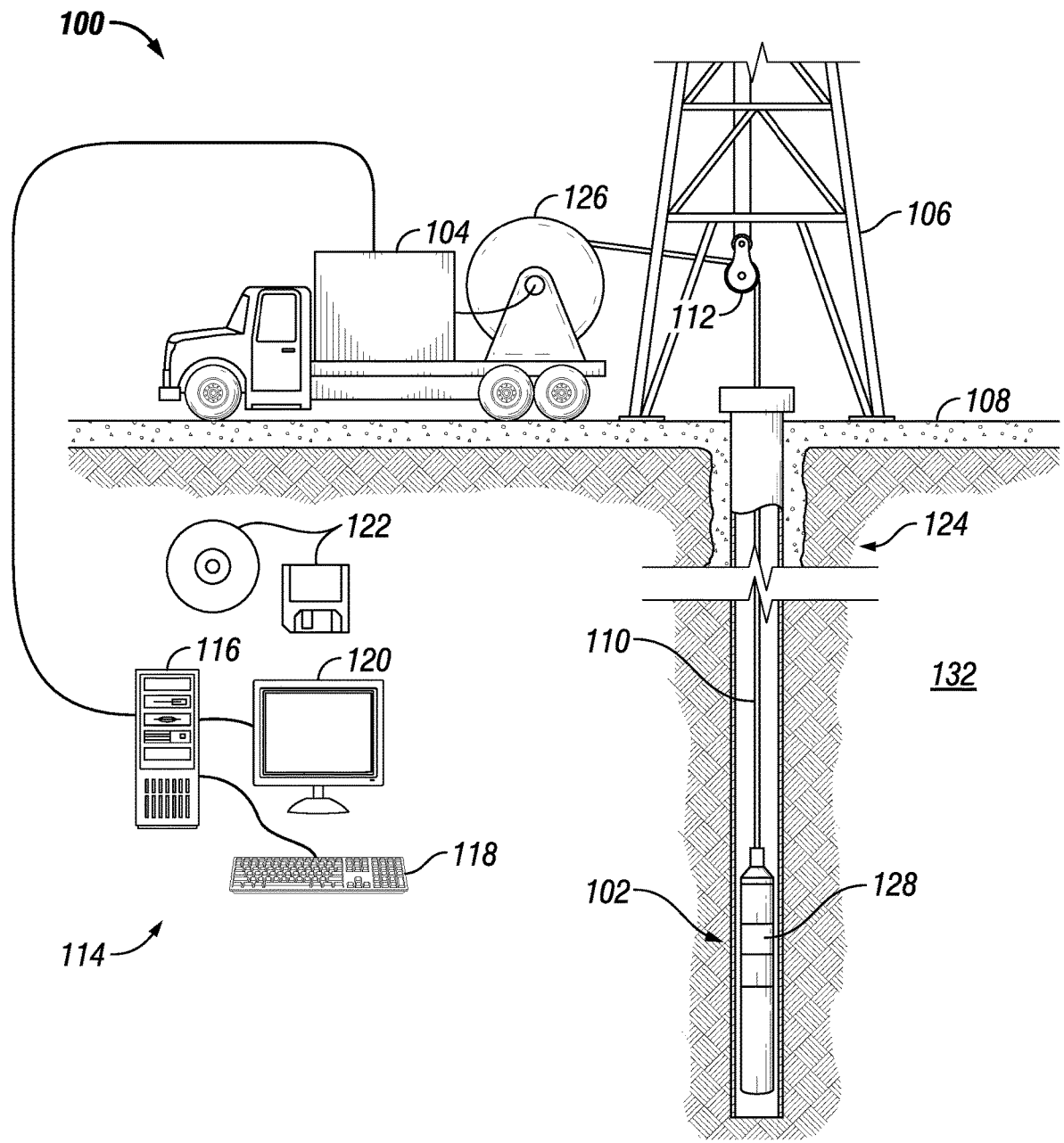
FIG. 1 illustrates an example of a well measurement system.

FIG. 1 illustrates a cross-sectional view of a well measurement system 100. As illustrated, well measurement system 100 may comprise downhole tool 102 attached a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, downhole tractor, or the like. In some embodiments, conveyance 110 may provide mechanical suspension, as well as electrical and/or optical connectivity, for downhole tool 102. Conveyance 110 may comprise, in some instances, a plurality of electrical conductors and/or a plurality of optical conductors extending from vehicle 104, which may provide power and telemetry. In examples, an optical conductor may utilize a battery and/or a photo conductor to harvest optical power transmitted from surface 108. Conveyance 110 may comprise an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some embodiments, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a personal computer 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as various input and output (I/O) devices, such as a keyboard 118, a mouse, and a video display 120. Information handling system 114 may also include one or more buses operable to transmit communications between the various hardware components. Furthermore, video display 120 may provide an image to a user based on activities performed by personal computer 116. For example, producing images of geological structures created from recorded signals. By way of example, video display unit may produce a plot of depth versus the two cross-axial components of the gravitational field and versus the axial component in borehole coordinates. The same plot may be produced in coordinates fixed to the Earth, such as coordinates directed to the North, East and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East and Vertical coordinates is taken into account. Additionally, hard copies of the plots may be produce in paper logs for further use.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 106 includes a load cell (not shown) which may determine the amount of pull on conveyance 110 at the surface of borehole 124. Information handling system 114 may comprise a safety valve (not illustrated) which controls the hydraulic pressure that drives drum 126 on vehicle 104 which may reels up and/or release conveyance 110 which may move downhole tool 102 up and/or down borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may comprise a gravimeter 128. In examples, downhole tool 102 may operate with additional equipment (not illustrated, i.e. shakers and equipment for producing shots) on surface 108 and/or disposed in a separate well measurement system (not illustrated) to record measurements and/or values from formation 132.

As discussed below, methods may be utilized by information handling system 114 to produce two or three-dimensional models of a subsurface structure, such as formation 132. An image may be generated that includes the two or three-dimensional models of the subsurface structure. These models may be used for well planning, (e.g., to design a desired path of borehole 124). Additionally, they may be used for planning the placement of drilling systems within a prescribed area. This may allow for the most efficient drilling operations to reach a subsurface structure. During drilling operations, measurements taken within borehole 124 may be used to adjust the geometry of borehole 124 in real time to reach a geological target. Measurements collected from borehole 124 may also be used to refine a two or three-dimensional model of a subsurface structure, discussed below.

Figure 2:
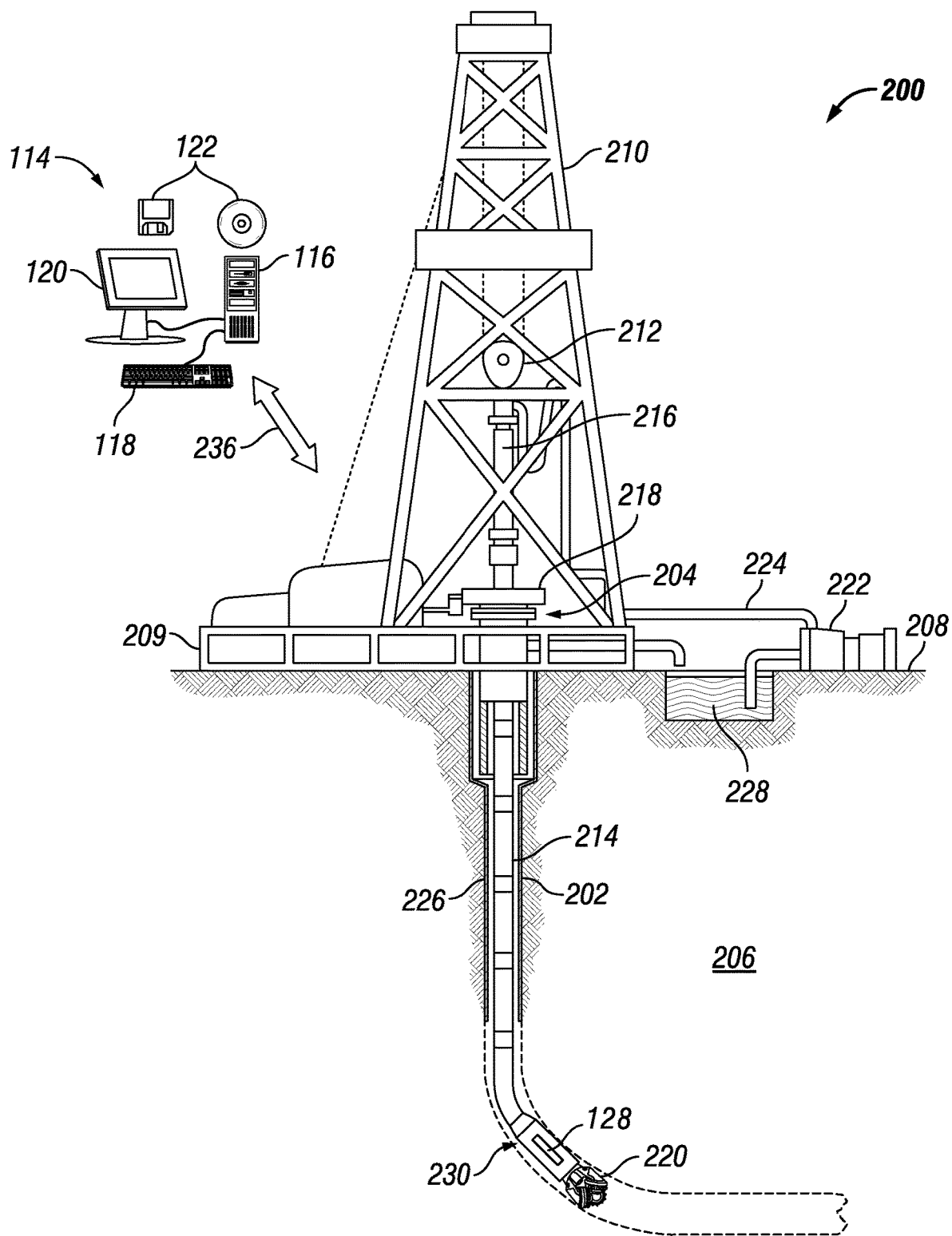
FIG. 2 illustrates an example of a drilling system.

FIG. 2 illustrates a drilling system 200. As illustrated, wellbore 202 may extend from a wellhead 204 into a subterranean formation 206 from a surface 208. Generally, wellbore 202 may include horizontal, vertical, slanted, curved, and other types of wellbore geometries and orientations. Wellbore 202 may be cased or uncased. In examples, wellbore 202 may include a metallic member. By way of example, the metallic member may be a casing, liner, tubing, or other elongated steel tubular disposed in wellbore 202.

As illustrated, wellbore 202 may extend through subterranean formation 206. As illustrated in FIG. 2, wellbore 202 may extending generally vertically into the subterranean formation 206, however wellbore 202 may extend at an angle through subterranean formation 206, such as horizontal and slanted wellbores. For example, although FIG. 2 illustrates a vertical or low inclination angle well, high inclination angle or horizontal placement of the well and equipment may be possible. It should further be noted that while FIGS. 1 and 2 generally depict land-based operations, those skilled in the art may recognize that the principles described herein are equally applicable to subsea operations that employ floating or sea-based platforms and rigs, without departing from the scope of the disclosure.

As illustrated, a drilling platform 209 may support a derrick 210 having a traveling block 212 for raising and lowering drill string 214. Drill string 214 may include, but is not limited to, drill pipe and coiled tubing, as generally known to those skilled in the art. A kelly 216 may support drill string 214 as it may be lowered through a rotary table 218. A drill bit 220 may be attached to the distal end of drill string 214 and may be driven either by a downhole motor and/or via rotation of drill string 214 from surface 208. Without limitation, drill bit 220 may include, roller cone bits, PDC bits, natural diamond bits, any hole openers, reamers, coring bits, and the like. As drill bit 220 rotates, it may create and extend wellbore 202 that penetrates various subterranean formations 206. A pump 222 may circulate drilling fluid through a feed pipe 224 through kelly 216, downhole through interior of drill string 214, through orifices in drill bit 220, back to surface 208 via annulus 226 surrounding drill string 214, and into a retention pit 228.

With continued reference to FIG. 2, drill string 214 may begin at wellhead 204 and may traverse wellbore 202. Drill bit 220 may be attached to a distal end of drill string 214 and may be driven, for example, either by a downhole motor and/or via rotation of drill string 214 from surface 208. Drill bit 220 may be a part of bottom hole assembly 230 at distal end of drill string 214. Bottom hole assembly 230 may further include a gravimeter 128. As will be appreciated by those of ordinary skill in the art, bottom hole assembly 230 may be a measurement-while drilling (MWD) or logging-while-drilling (LWD) system.

Without limitation, bottom hole assembly 230 may be connected to and/or controlled by information handling system 114, which may be disposed on surface 208. Without limitation, information handling system 114 may be disposed down hole in bottom hole assembly 230. Processing of information recorded may occur down hole and/or on surface 208. Processing occurring downhole may be transmitted to surface 208 to be recorded, observed, and/or further analyzed. Additionally, information recorded on information handling system 114 that may be disposed down hole may be stored until bottom hole assembly 230 may be brought to surface 208. In examples, information handling system 114 may communicate with bottom hole assembly 230 through a communication line (not illustrated) disposed in (or on) drill string 214. In examples, wireless communication may be used to transmit information back and forth between information handling system 114 and bottom hole assembly 230. Information handling system 114 may transmit information to bottom hole assembly 230 and may receive as well as process information recorded by bottom hole assembly 230. In examples, a downhole information handling system (not illustrated) may include, without limitation, a microprocessor or other suitable circuitry, for estimating, receiving and processing signals from bottom hole assembly 230. Downhole information handling system (not illustrated) may further include additional components, such as memory, input/output devices, interfaces, and the like. In examples, while not illustrated, bottom hole assembly 230 may include one or more additional components, such as analog-to-digital converter, filter and amplifier, among others, that may be used to process the measurements of bottom hole assembly 230 before they may be transmitted to surface 208. Alternatively, raw measurements from bottom hole assembly 230 may be transmitted to surface 208.

Any suitable technique may be used for transmitting signals from bottom hole assembly 230 to surface 208, including, but not limited to, wired pipe telemetry, mud-pulse telemetry, acoustic telemetry, and electromagnetic telemetry. While not illustrated, bottom hole assembly 230 may include a telemetry subassembly that may transmit telemetry data to surface 208. At surface 208, pressure transducers (not shown) may convert the pressure signal into electrical signals for a digitizer (not illustrated). The digitizer may supply a digital form of the telemetry signals to information handling system 114 via a communication link 236, which may be a wired or wireless link. The telemetry data may be analyzed and processed by information handling system 114.

As illustrated, communication link 236 (which may be wired or wireless, for example) may be provided that may transmit data from bottom hole assembly 230 to an information handling system 114 at surface 108. Information handling system 134 may include a personal computer 116, a video display 120, a keyboard 118 (i.e., other input devices.), and/or non-transitory computer-readable media media 122 (e.g., optical disks, magnetic disks) that can store code representative of the methods described herein. In addition to, or in place of processing at surface 208, processing may occur downhole.

Gravimeter 128 may measure the absolute value of acceleration. In examples, gravimeter 128 include pendulums and devices that measure the time of flight of an item in free fall. These examples may be bulky, costly, and expensive. Gravimeter 128 may also measure the acceleration relative to a fixed offset (e.g. Carlson-Romberg gravimeters). Gravimeters 128, like the Carlson-Romberg gravimeters, do not read the absolute value of acceleration. They instead read the offset of the acceleration at a given location from a pre-set value of acceleration. As such, the instrumentation may have high sensitivity within a limited range. A smaller device, Carlson-Romberg gravimeters may be better suited for downhole environments. In examples, the gravimeter 128 may include an atom interferometer, such as an atom-chip fountain gravimeter, which may measure an absolute value of acceleration using laser cooled atoms and has been demonstrated to reach accuracies better than one part in $10^8$ of gravity in small packages. In examples, a MEMS gravimeter may provide measurements over a full range of gravitational accelerations that are experienced on earth (from 0 to approximately 1 g when orientation is taken into account), the measurement is, in effect, a differential measurement, which is more like that of a gravimeter that measures relative to a fixed offset than it is like an absolute gravimeter. For example, a MEMS gravimeter may include cantilever devices, coupled cantilever devices, bridge devices, moving mass pendulums, and/or the like. Additionally, devices may include those that may measure optically and others that may measure electrical properties.

Gravimeter 128, for example may be a single-axis gravimeter, but gravimeter 128 may also be a 3-axis gravimeter. The orientations of the three sense-axes of gravimeter 128 may be offset symmetrically from the symmetry axis of downhole tool 102 by $$\cos^{-1}\left(\frac{1}{\sqrt{3}}\right) \quad (1)$$

or about 54.74° so as to form an orthogonal triad that is symmetrically distributed around the tool axis. Each gravimeter 128 constituting the 3-axis gravimeter may be designated by an index "i", where i=1, 2, or 3. The output from each of these gravimeters 128 may be given by the following relation:

$$\text{Gmeasured}_i = SFi * \cos(\theta_i) * Gt + \text{bias} \quad (2)$$

where Gmeasured$_i$, is the acceleration measured by gravimeter i at a fixed point p, $SF_i$ is the scale factor for gravimeter i, $\theta_i$, is the angle that the sense-axis of gravimeter i makes with the Earth's gravitational field, Gt is the magnitude of the earth's gravitational field and bias$_i$ is the bias of gravimeter i.

Gravimeters 128 may be calibrated. For calibration, gravimeters 128 may be attached to a linear actuator that moves along the axis of symmetry of downhole tool 102. As discussed below, there may be a plurality of gravimeters 128 that may be rotated about the symmetry axis of downhole tool 102 during calibration. In examples, when actuated, all gravimeters 128 may be subjected to the same translation. If this translation occurs at a constant acceleration along the axis of symmetry of downhole tool 102 for a period of time, then this constant acceleration may be added vectorially to the gravitational acceleration experienced at each gravimeter 128. This makes it possible to calibrate the output of each gravimeter 128 to a known additive offset to the earth's gravitational field.

Figure 3:
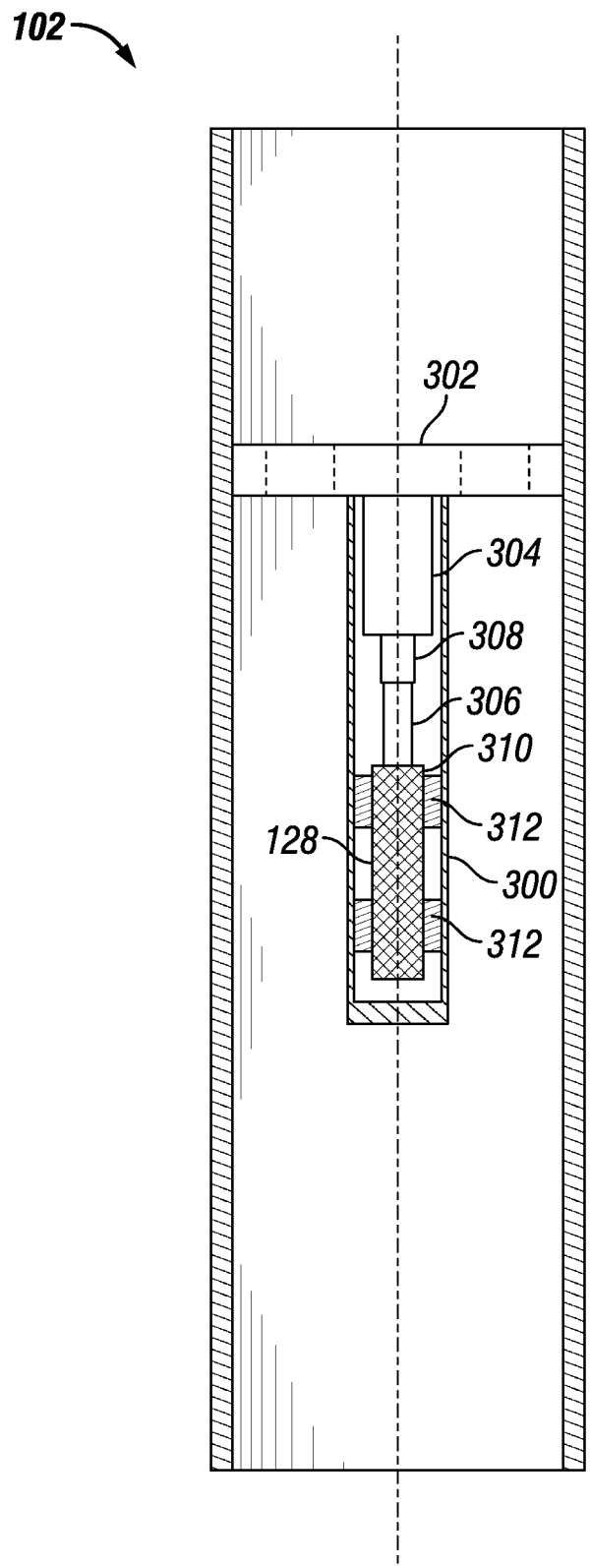
FIG. 3 illustrates an example of a downhole tool.

As illustrated in FIG. 3, Gravimeter 128 may be disposed in a sonde 300. In examples, gravimeter 128 may be disposed as an insert and/or an outset. When packaged as sonde 300, sonde 300 may be mounted within downhole tool 102 using a hanger 302. Hanger 302 may allow a mechanical connection of downhole tool 102 to sonde 300.

Mounted within sonde 300 and mechanically connected to hanger 302 or to an item fixed to hanger 302 is a linear actuator 304. Linear actuators 304 may include piezoelectric linear actuators. Gravimeter 128 may operate in two modes: 1) a stepper mode, and 2) an analog mode. A proximal end of a linkage 306 extends from shaft 308 of linear actuator 304. The distal end of linkage 306 may be connected to a package 310 that contains gravimeter 128 which may comprise three axes. It should be noted that a plurality of gravimeters 128 may be disposed in package 310. For example, there may a first gravimeter, a second gravimeter, a third gravimeter, or more. As noted earlier, the three sense axes of gravimeter 128 may be oriented so that each of them makes an angle defined as $$\operatorname{ArcCos}\left[\frac{1}{\sqrt{3}}\right] \quad (3)$$

with respect to the symmetry axis of gravimeter 128. Package 310 may move between at least one and/or a plurality of bushings 312 mounted within sonde 300. Bushings 312 may allow for motion of package 310 along the axis of symmetry of downhole tool 102.

Figure 4:
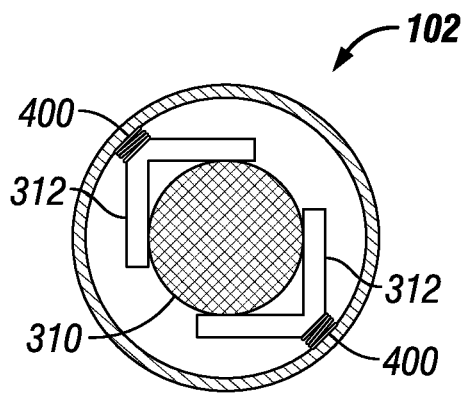
FIG. 4 illustrates a top down view of a sonde disposed between a split bushing arrangement for use with a gravimeter and a gravimeter calibrator in the downhole tool.

As illustrated in FIG. 4, bushing 312 may include two diametrically opposed spring loaded split bushings 312. Springs 400 may exert pressure against bushing 312 from sonde 300, which may stabilize package 312. Each bushing 312 may include a "V" block which is in contact with the package 310 along two lines that are parallel to the symmetry axis of downhole tool 102. This arrangement is intended to minimize sideways motion of package 310 and damage due to vibration while drilling. To minimize wear on package 310 due to sliding within bushing 312, the outer surface of package 310 may be anodized or coated with a material resistant to wear and/or lubricated.

In examples, bushings 312 may be replaced by a ball bushing bearing, not illustrated. This may constrain linkage 306, referring to FIG. 3, between actuator 304 and package 310 with one or more ball bushing bearings rather than package 310 itself.

Figure 5:
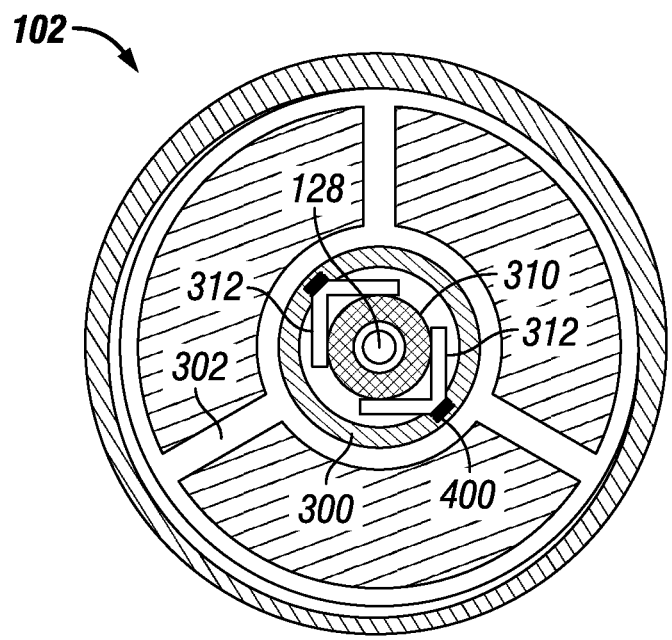
FIG. 5 illustrates a top down view of the downhole tool.

FIG. 5 illustrates a top view of downhole tool 102. Disposed between bushings 312, package 310 holding gravimeter 128 may be prevented from moving laterally as springs 400 exert force against sonde 300. Sonde 300 may be attached to hanger 302, which may be connected to downhole tool 102.

Figure 6:
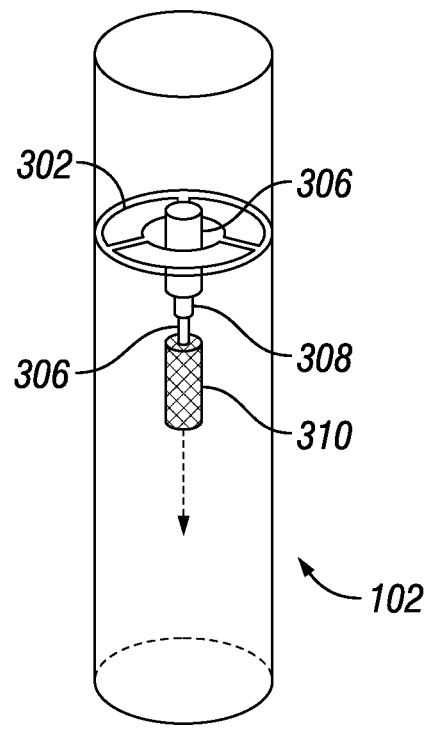
FIG. 6 illustrates an isometric view of the downhole tool.

FIG. 6 illustrates an isometric view of downhole tool 102. Hanger 302 may be attached to downhole tool 102. Linear actuator 304 may be connected to hanger 302 and shaft 308 may extend form linear actuator 304. Shaft 308 may attach to linkage 306, where linkage 306 may attach to package 310. It should be noted that linear actuator 304, shaft 308, linkage 306, and package 310 may be disposed in sonde 300, as illustrated in FIGS. 3.

Figure 7:
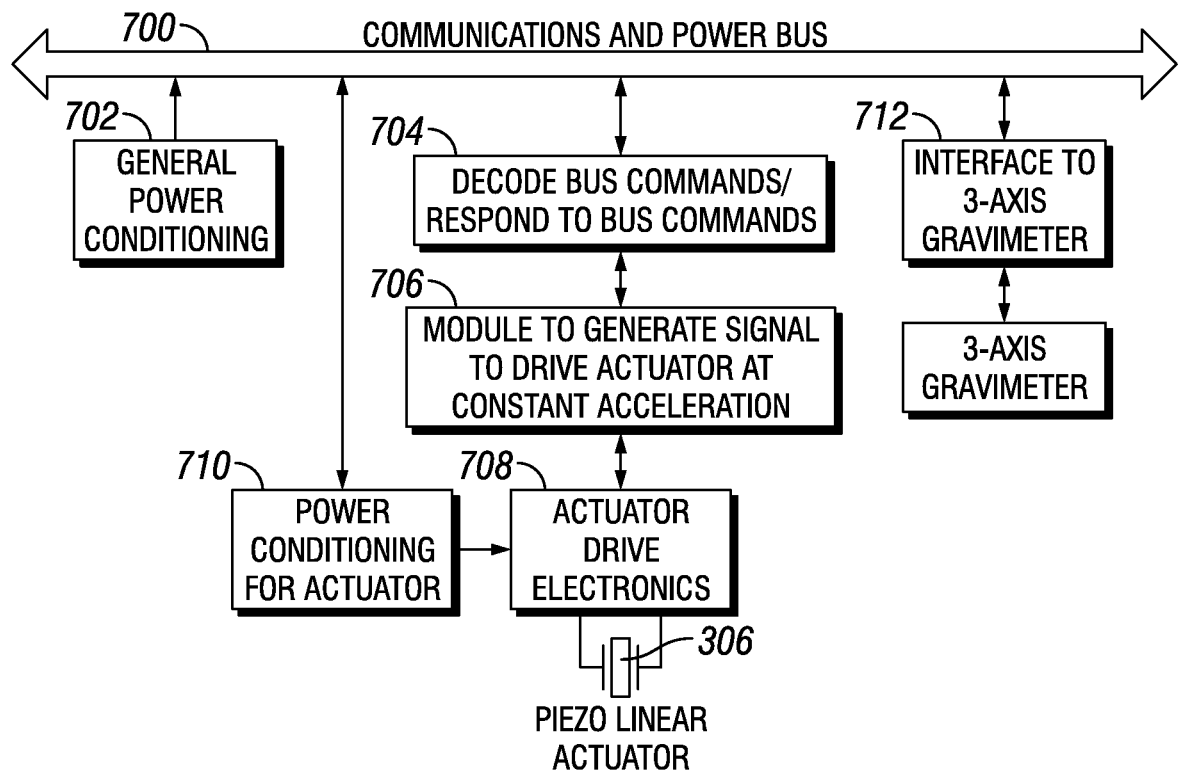
FIG. 7 illustrates a graphical view of the flow of power and information.

FIG. 7 illustrates an overview of the communication between electronics and control system within downhole tool 102 and information handling system 114, as illustrated in FIG. 1. A communication bus 700 may carry data and power. In examples, a separate power bus may be used. Module 702 "General Power Conditioning" provides power to all of the other modules. In examples, module 702 may comprise a power source disposed on surface 108 and/or downhole tool 102 (Referring to FIG. 1). Module 704 titled "Decode bus commands/respond to bus commands" responds to commands to perform a calibration sequence, wherein these commands are transmitted via communication bus 700. With suitable logic, when a command is received to perform a calibration sequence, this sequence is initiated in module 706 titled "Module to generate signal to drive actuator at constant acceleration." Module 706 contains digital logic and (preferably) a microprocessor as well as analog circuit to generate low power signals that are proportional to the signals that may be applied to the linear actuator 304. (Referring to FIG. 3). These signals may be amplified by the circuitry provided in module 708 titled "Actuator Drive Electronics." The portion of the power for the drive electronics is provided via module 710 titled "Power Conditioning for Actuator," which in examples, may derive its power from communication bus 700. In examples, module 710 may be connected to a battery pack connected to sonde 300 (Referring to FIG. 3) or contained within it. In examples, power may be supplied via an alternator (not illustrated) with an impeller that is driven by mud flow within the bore of a drill string 214. When a command is received by module 704, a command is also provided to module 712 titled "Interface to the 3-axis gravimeter." This command may initiate a sampling sequence in which samples may be taken, preferably at a fixed rate, from gravimeter 128 (Referring to FIG. 1). Sampling may be performed concurrently across a plurality of gravimeters 128 in examples where downhole tool 102 may comprise a plurality of gravimeters 128. These samples may be communicated directly along communications bus 700 or stored in a local buffer (not illustrated) within an information handling system 114 (Referring to FIG. 1) disposed on downhole tool 102 and transmitted along communication bus 700 when the calibration sequence has been completed. When the calibration sequence has been completed, module 704 titled "Decode bus commands/respond to bus commands" provides a signal on communication bus 700 signifying that the calibration sequence has been completed.

Figure 8A:
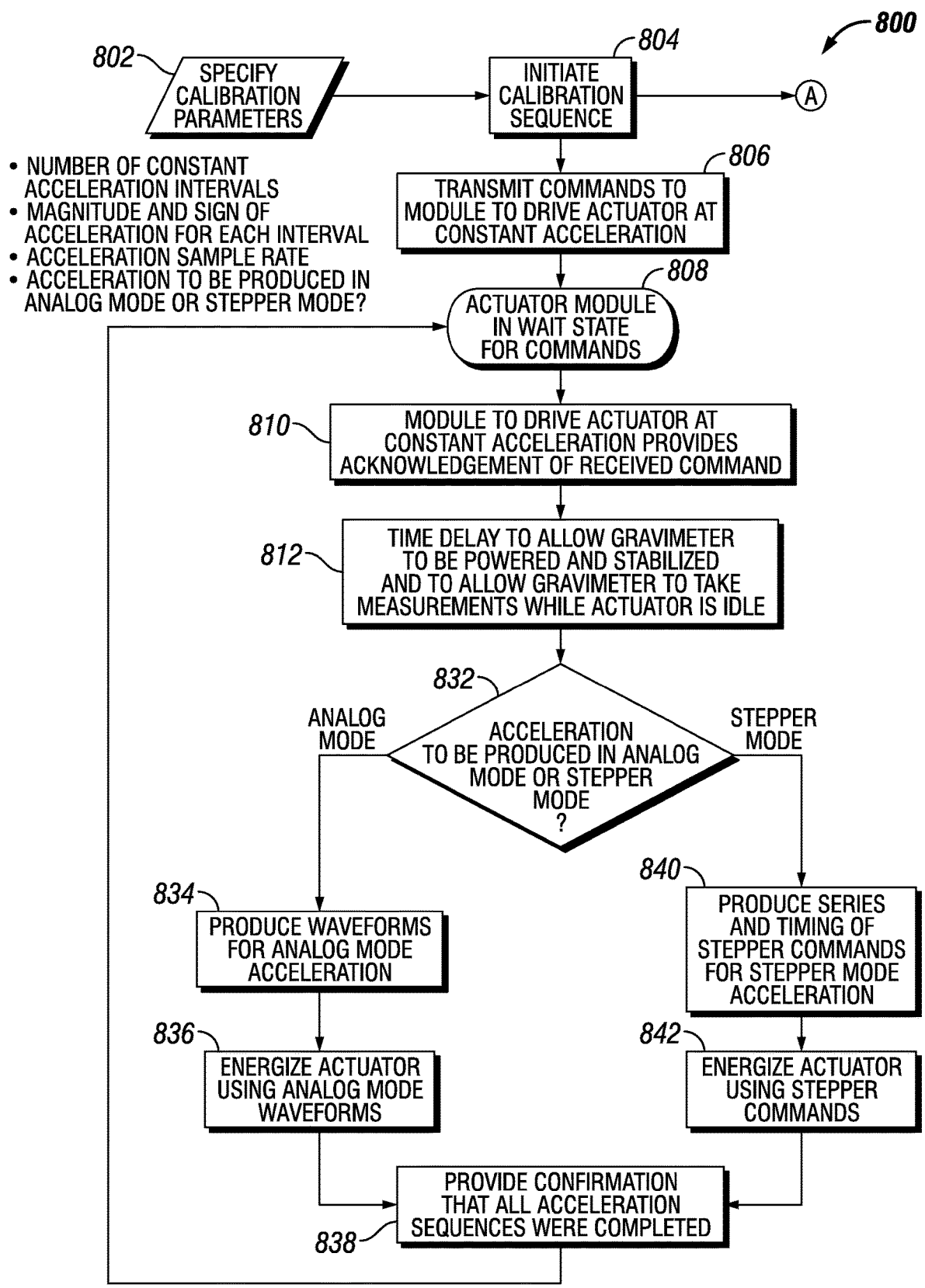
FIGS. 8a and 8b illustrate a flow chart for calibration of a gravimeter.
Figure 8B:
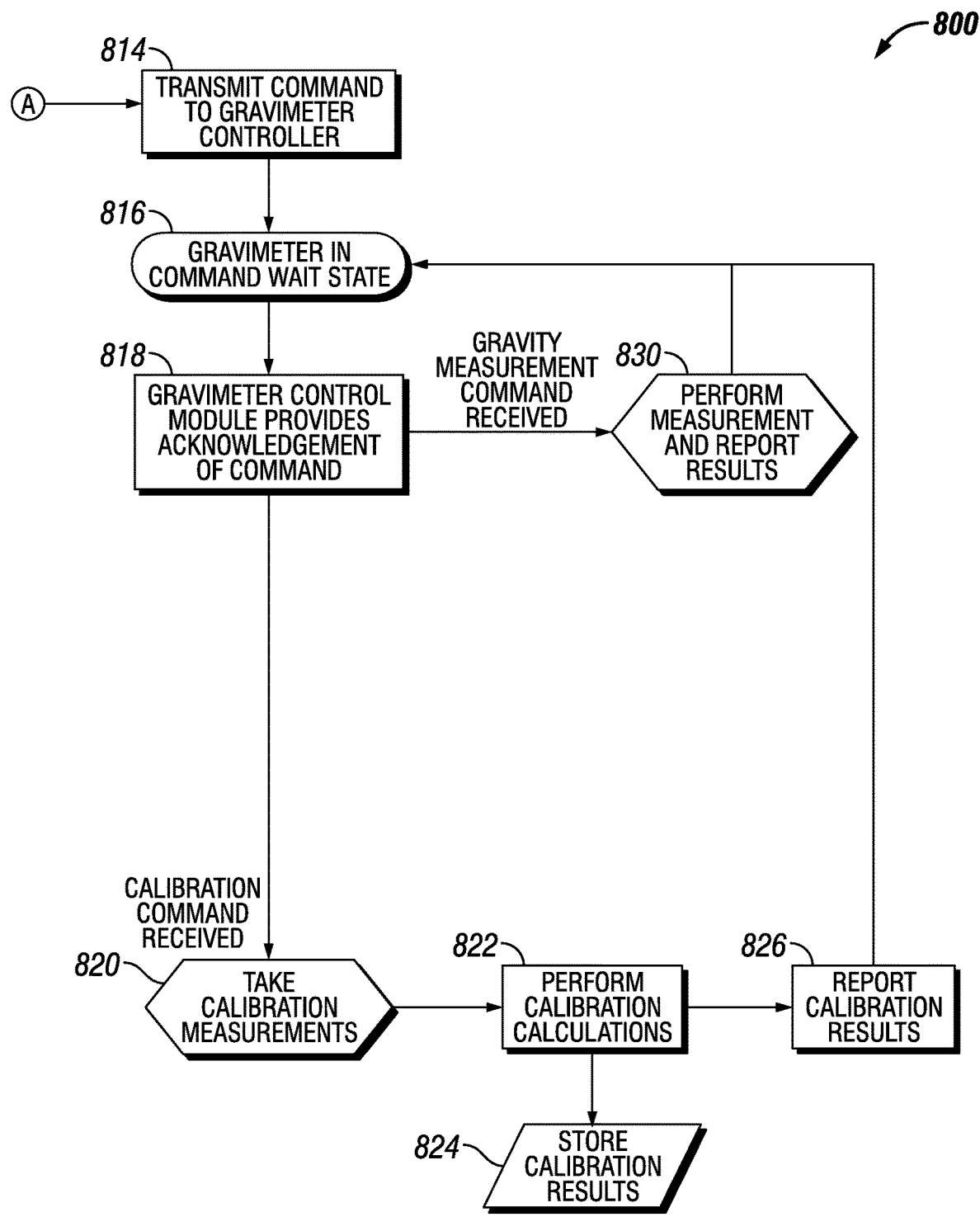

FIGS. 8a and 8b illustrate a workflow summarizing the elements in calibration sequence 800. Calibration sequence 800 may include three main data acquisition sequences: 1) measurements with gravimeter 128 of the ambient gravitational field when linear actuator 304 is not energized during this first sequence, 2) measurements with gravimeters 128 of the ambient gravitational field while linear actuator 304 is energized and 3) measurements with gravimeter 128 of the ambient gravitational field while linear actuator 304 is not energized (Referring to FIG. 3). Commands from information handling system 114 disposed on surface 108 may not be provided separately to information handling system (not illustrated) that may be disposed on downhole tool 102 (Referring to FIG. 1), which may control linear actuator 304 and/or gravimeter 128. This may facilitate synchronization between the two units in the execution of commands and the sharing of data.

Calibration sequence 800 may begin with specifying calibration parameters, as shown in block 802. This may be done once for all calibrations, or if the environment may be hostile (e.g., a lot of vibration and shock is experienced between calibrations and/or the expected drift with temperature is large), these parameters may be adjusted depending on the environment. During calibration sequence 800 in which linear actuator 304 is energized, parameters for calibration may include a series of time intervals during which the acceleration produced via linear actuator 304 is constant. The parameters needed to specify this series of time intervals may be provided with the command to carry out a calibration. These parameters may include: the number of constant (and nonzero) acceleration intervals to be used, the magnitude and sign of the acceleration to be generated in each interval and the sample rate to be used with the gravimeters 128. If the temperature of operation is considerably above the temperature at which the noise associated with gravimeter 128 is near its minimum, it may be desirable to specify the number of intervals each time a calibration is carried out so as to improve the accuracy of the measurement. In this case, the number of intervals may depend on the anticipated noise level; typically, the number of intervals will be proportional to the square of the ratio of the expected noise level to the minimum noise level. It is preferable to follow each interval of constant acceleration with an interval having an acceleration of opposite sign (or direction) to its predecessor. This not only expands the range of the calibration, but makes use of the time to retract shaft 308. As disclosed below, linear actuators 304 may include two modes: an analog mode, which may be used for relatively short displacements, and a stepper mode, in which it is possible to provide longer displacements. Thus, it may be necessary to specify whether the acceleration sequences will be in analog mode or stepper mode (or a combination thereof).

Once calibration parameters have been specified, a command may be issued by information handling system 114 disposed on surface 108 to an information handling system (not illustrated) disposed on downhole tool 102 to initiate calibration sequence, as shown in block 804. In examples, the information handling system disposed on downhole tool 102 may include an actuator controller (not illustrated) and a gravimeter controller (not illustrated). Each controller may be utilized to initiate a calibration sequence. This command should include calibration parameters. It is important that the timing of events in the actuator controller and the gravimeter controller be kept in reasonable synchrony (within say a few milliseconds), thus the actuator controller and the gravimeter controller may be in communication with each other. In examples, when the actuator controller and the gravimeter controller are not in direct communication with each other, each controller may communicate directly with information handling system 114 disposed on surface 108. Once a command from information handling system 114 to initiate calibration sequence at block 804 has been acknowledged, downhole tool 102 carries out the following operations.

As illustrated in block 806, information handling system 114 (Referring to FIG. 1) transmits commands to the actuator module to drive linear actuator 304 (Referring to FIG. 3) at a constant acceleration. Depending on the excitation mode to be used with linear actuator 304 (discussed below), the sequence of voltages vs. time (for analog mode) or impulses at a given voltage vs. time (for stepper mode) may be calculated in a way such that the actuator controller may access this sequence and control the displacement of linear actuator 304. The total time of the portion of the calibration sequence in which linear actuator 304 is active is calculated which may be calculated separately in the actuator controller and the gravimeter controller or shared between the control modules.

In block 808, the actuator module goes into a wait state until a command is given. In block 810, the actuator module drives linear actuator 304 (Referring to FIGS. 3) at constant acceleration, and provides acknowledgement of received commands. It should be noted that the actuator module may drive linear actuator 304 after commands from block 832 or block 836, discussed below. In examples, block 810 may be by passed from block 808 to block 812. In block 812, power may be applied to gravimeters 128 (Referring to FIG. 1) with sufficient time allowed for them and their associated electronics to stabilize. After a time in which the associated electronics have stabilized, a suitable time for measurements may pass allowing gravimeter 128 to take measurements while linear actuator 304 is idle.

For example, as illustrated in FIGS. 8*b*, in block 814, while linear actuator 304 may be idle, a command may be sent from information handling system 114 to the gravimeter controller. In block 816, gravimeter 128 (Referring to FIG. 1) may be in a wait state until a command from information handling system 114 may be sent. In block 818, once a command is received, the command is acknowledged. For a gravimeter 128, two commands may be given, a calibration command or a gravity measurement command.

When a calibration command is sent from information handling system 114, in block 820, acceleration data may be acquired from gravimeter 128 (Referring to FIG. 1) at a specified "acceleration sample rate" and over a total time. During this data acquisition, linear actuator 304 is not powered. The data is stored in a buffer memory and/or information handling system 114. It should be noted that buffer memory may be included in information handling system 114. Additionally, acceleration data may be acquired from gravimeters 128 (Referring to FIG. 1) at a specified "acceleration sample rate" and over a total time. During this time, linear actuator 304 (Referring to FIG. 3) accelerates package 310 (Referring to FIG. 3) through accelerations, which may be stored in a buffer memory and/or information handling system 114. It should be noted that buffer memory may be included in information handling system 114.

Before processing, acceleration data may again be acquired from gravimeter 128 (Referring to FIG. 1) at a specified "acceleration sample rate" and over the total time. During data acquisition, linear actuator 304 is not powered. The data is stored in a buffer memory and/or information handling system 114. It should be noted that buffer memory may be included in information handling system 114.

In block 822, processing of the recorded data from block 820 may occur. The following calculations may be carried out with information handling system disposed on downhole tool 102, which may further include the gravimeter controller. It should be noted that processing may occur in information handling system 114 disposed on surface 108. During processing, the average and standard deviation of the data stored should be calculated. The stored data may include measurements when linear actuator 304 is moving and/or not moving. It should be noted that a first measurement may be taken with linear actuator 304 is moving and a second measurement may be taken when the linear actuator is not moving, or vice-versa. Additionally, a first measurement and a second measurement may be taken when the linear actuator 304 is moving or not moving. An average and standard deviation of each data set may be sent to information handling system 114 for additional calibration, to be stored locally, and/or both. Accordingly, the following steps can be carried out in the gravimeter controller or in information handling system 114.

First, calculate the difference $\delta\alpha 35$ between the average accelerations when linear actuator 304 is idle and accelerating. Calculate the standard deviation $\sigma\delta\alpha_{35}$ in this difference.

$$\delta\alpha_{35} = \alpha_3 - \alpha_5 \qquad (4)$$

$$\sigma\alpha_{35} = \sqrt{\frac{\sigma\alpha_3^2 + \sigma\alpha_5^2}{2}} \qquad (5)$$

where $\alpha_3$ and $\alpha_5$ are the average accelerations experienced while the actuator was inactive, $\sigma\alpha_3$ and $\sigma\alpha_5$ are the standard deviations in $\alpha_3$ and $\alpha_5$.

In the next step, the ratio of the absolute value of $\delta\alpha_{35}$ and $\sigma\delta\alpha_{35}$ may be calculated. If this is smaller than a predetermined threshold, it is assumed that there is no statistical difference between the measurements of the ambient gravitational field before and after the measurement during which linear actuator 304 (Referring to FIG. 3) was active.

The observed differential acceleration may be calculated as follows:

$$\delta\alpha = \alpha_4 - .5*(\alpha_3 + \alpha_5) \qquad (6)$$

where $\delta\alpha$ is the observed change in acceleration due to motion of the actuator at the specified acceleration level and $\alpha_4$ is the average acceleration experience while linear actuator 304 was active.

The standard deviation $\sigma\alpha_{35}$ of the average accelerations may be calculated as follows:

$$(.5*(\alpha_3 + \alpha_5)) \qquad (7)$$

$$\sigma\alpha_{35} = \sqrt{\frac{N-1}{2N-1}}\sqrt{\sigma\alpha_3^2 + \sigma\alpha_3^2} \qquad (8)$$

where N is the number of acceleration sample for each constant acceleration sequence, which may then be utilized to calculate $$\frac{\delta\alpha}{\sigma\alpha_{35}} \qquad (9)$$

if $$\frac{\delta\alpha}{\sigma\alpha_{35}} > \tau \qquad (10)$$

for some pre-specified τ proceed to block 824, otherwise, in block 826 send a message to the system that issued the command to carry out a calibration that the calibration was not successful. A suitable value for τ is about four. Other tests may be used, depending upon the distribution of gravimeter noise. In these calculations, it was assumed that the gravimeter noise is normally distributed. Using $\delta\alpha$, the scale factor used by the gravimeter to calculate acceleration values may be modified. For the purposes of discussion, the gravimeter scale factor will be defined as the ratio of the reported acceleration to the actual acceleration in the absence of bias. If τ is greater than Equation (9), a message may be sent to information handling system 114 that the calibration was not successful and should be repeated.

Using $\delta\alpha$, the scale factor used by gravimeter 128 (Referring to FIG. 1) to calculate acceleration values may be modified. In the absence of bias, the gravimeter scale factor may be defined as a ratio of the reported acceleration to the actual acceleration. The scale factor may be modified in a number of ways. The scale factor used during the measurements (the "old scale factor") may simply be replaced by a new scale factor obtained by multiplying the old scale factor by the ratio of the acceleration to $\delta\alpha$. In examples, the noise in the measurement may be taken into account and carry out, and a weighted sum may be calculated of the old scale factor and the new one. An example of such a weighted sum is given by:

$$S_{updated} = \frac{S_{old} + \gamma*\left(\frac{\delta\alpha}{\sigma\alpha_{35}}\right)^\beta*\left(\frac{\Delta A}{\delta\alpha}\right)}{1 + \gamma*\left(\frac{\delta\alpha}{\sigma\alpha_{35}}\right)^\beta} \qquad (11)$$

where $\Delta A$ is the acceleration provided by the linear actuator, $\beta > 0$ and typically $\beta < 1$, $0 < \gamma$ and typically $\gamma < 1$, $S_{updated}$ is the revised scale factor.

As illustrated in FIG. 8b, in block 824 the processed measurements are stored as $S_{updated}$, on the information handling system disposed on downhole tool 102 and/or information handling system 114 disposed on surface 108. In block 826 the processed measurements transmit $S_{updated}$ to information handling system 114. The gravimeter 128 (Referring to FIG. 1) is then in block 816 to wait for further instructions.

In block 830 the gravimeter controller may also be commanded to take a measurement of the ambient gravitational field (while there is no power on linear actuator 304). During block 822, calibration measurements are taken when gravimeter 128 (Referring to FIG. 1) is accelerating at a constant speed. As illustrated in FIGS. 8a, in block 832, acceleration of gravimeter 128 may be produced in an analog mode or a stepper mode. In block 834, analog mode may be utilized to produce waveforms for analog mode acceleration. Within a finite bandwidth, and within a fixed amount of travel, linear actuator 304 (Referring to FIG. 3), when in analog mode, may be powered so as to provide a fixed acceleration. In block 836, linear actuator 304 may be energized using the analog mode waveforms.

In the analog mode, the displacement d of linear actuator 304 may be a simple linear function of the drive voltage V:

$$d = \kappa*V \qquad (12)$$

where κ is a constant. In examples, κ=3*10−6 m/250V or κ=12*10−9 m/V. For a constant acceleration α, the displacement d after a time t may be given by:

$$d = 0.5*\alpha*t^2 \qquad (13)$$

Thus, the voltage as a function of time needed to achieve a constant acceleration of α may be given by:

$$V(t) = \frac{1}{2}\frac{\alpha}{\kappa}t^2 \qquad (14)$$

For a constant acceleration a of 10 nm/s², the maximum voltage of 250 volts may be reached after 24.49 seconds at which time shaft 308 (Referring to FIG. 3) may have advanced to its maximum displacement in the analog mode of 3 micrometers. Such a voltage profile may be easily achieved by calculating the voltage as a function of time at (for example) 1 ms intervals, inputting this voltage to a digital to analog converter and amplifying the output of the converter with a gain that provides a maximum signal of 250 volts after 24.49 microseconds. Negative accelerations may be achieved in a similar manner, but by using negative voltages, and after shaft 308 of linear actuator 304 has been fully extended.

Repeated measurements of constant acceleration during intervals of 24.49 seconds may be sufficient to provide calibration of gravimeters 128 (Referring to FIG. 1). The outputs of gravimeter 128 may be sampled every millisecond for a total of 24,490 samples. The transient nature due to the initiation of acceleration may be eliminated from the data sequence based on the known impulse response of gravimeter 128. The remaining sequence of samples may be averaged to provide an acceleration value. The averages from successive 24.49 second intervals may also be averaged so as to provide a more accurate value of the acceleration.

There may be situations in which a longer calibration time may be required. This may be a function of the impulse response time of gravimeters 128. In this case, it may be necessary to operate linear actuator 304 (Referring to FIG. 3) in its stepper mode. In block 840, in stepper mode, a series and timing of stepper commands for the stepper mode acceleration may be issued from information handling system 114 (Referring to FIG. 1). In block 842, linear actuator 304 may be energized using stepper commands. It should be noted that a true constant acceleration cannot be achieved in stepper mode, but a close approximation to a constant acceleration may be achieved. In the stepper mode, a series of displacements "d" are made at pre-specified times that are distributed such that, on average, the acceleration is constant. Assuming that there is no displacement at time t=0, impulses at instants of time that produce a suitable acceleration profile with individual steps of size d at time instants $t_m$ are given by:

$$t_m = \sqrt{\frac{2*d}{\alpha} + t_{m-1}^2} \quad (15)$$

Figure 9:
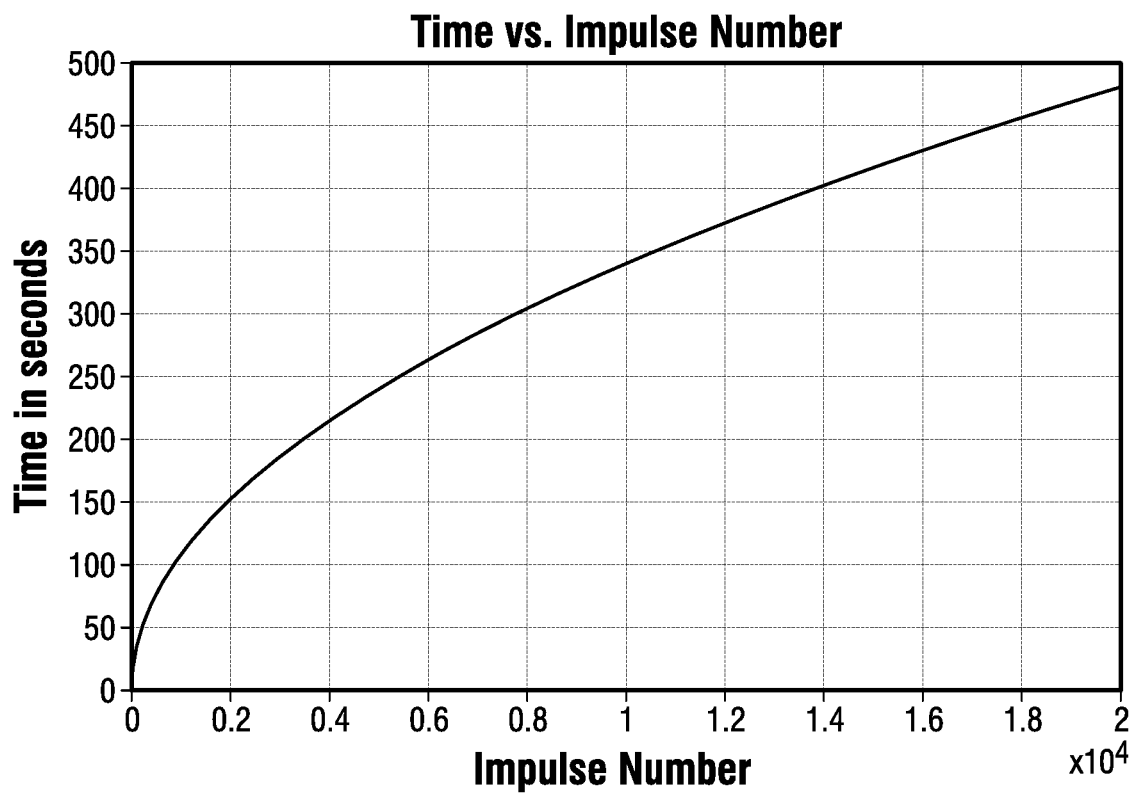
FIG. 9 illustrates a graph of impulse number compared to time.
Figure 10:
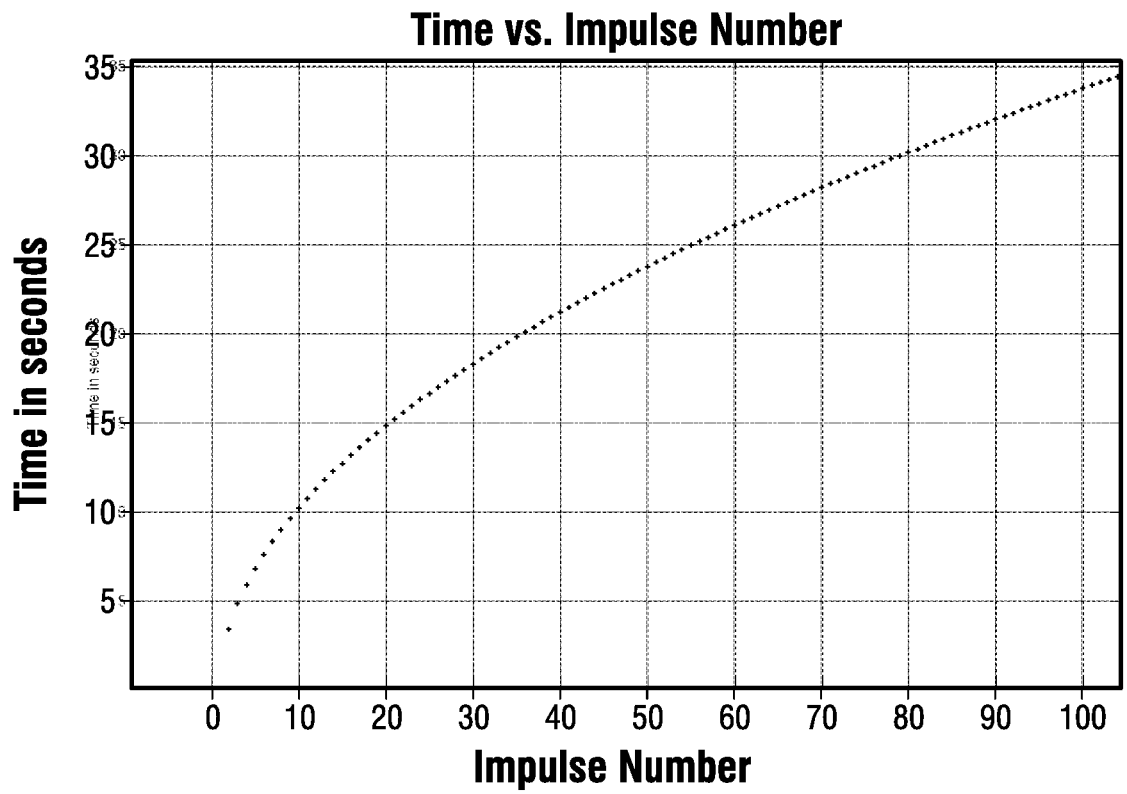
FIG. 10 illustrates a chart of the time for each step in a stepper motor to achieve constant acceleration.
Figure 11:
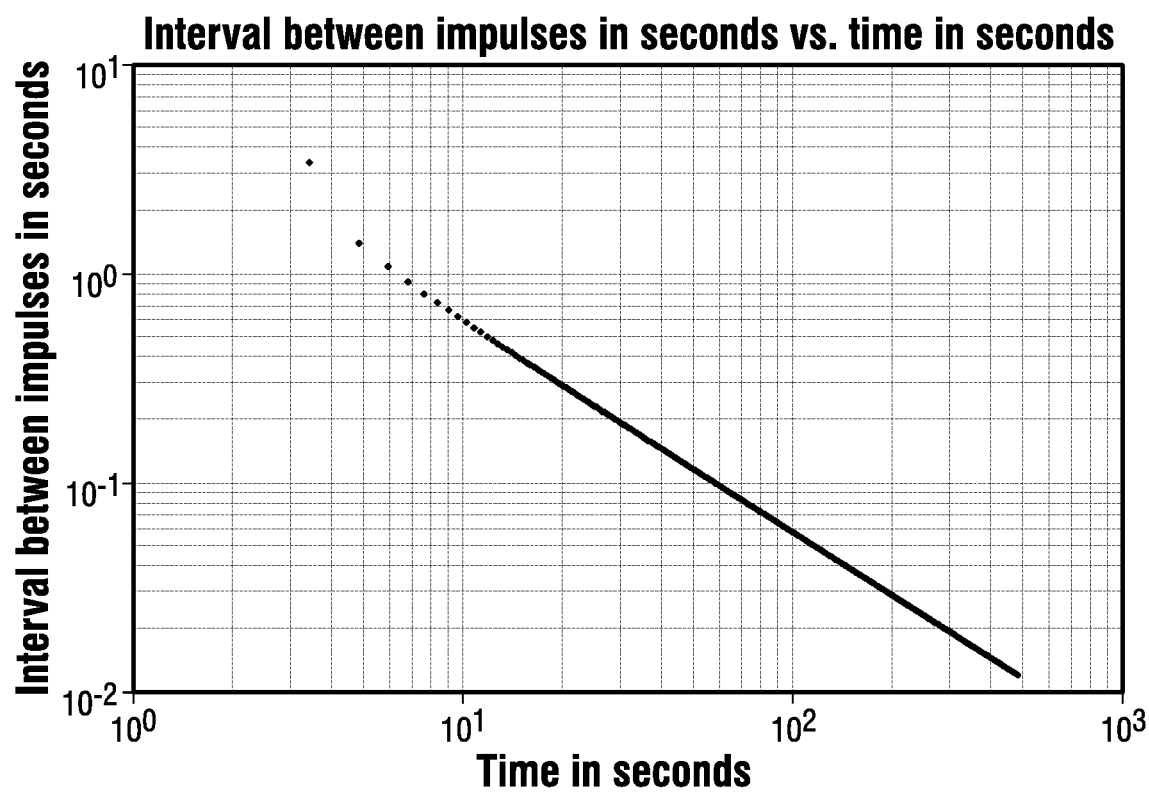
FIG. 11 illustrates a chart of the interval between impulses in seconds as a function of time.

When working in the stepper mode, in order to achieve the smoothest operation, a small step size may be utilized that is compatible with being able to achieve the desired acceleration and sustain it for the desired time. As illustrated in FIG. 9, the time of each step to achieve a constant acceleration of $\sqrt{3}*10$ nm/s$^2$ with a step size of 100 nm is graphed. The scale of FIG. 9 is such that the individual impulses are not evident. FIG. 10 provides a view of the times of the first 400 impulses. FIG. 11 provides the time intervals between impulses as a function of time. As illustrated, after about 500 seconds, the interval between pulses is approximately 10 ms, the smallest allowable interval for this device (this occurs after about 20,000 impulses).

Figure 12:
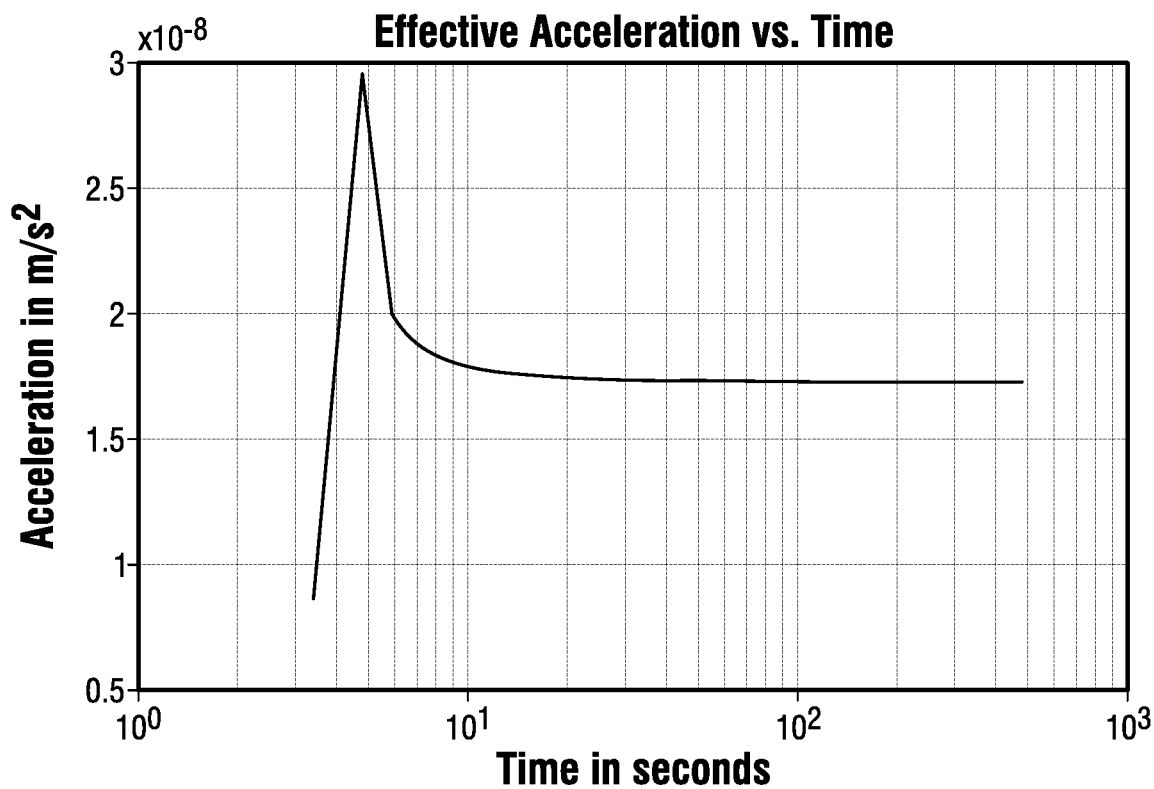
FIG. 12 illustrates a chart of average acceleration vs time.

FIG. 12 illustrates the average acceleration versus time. The initial performance of the stepper algorithm produces a spike in the acceleration which settles down to a nearly constant value after about 20 seconds. Thus, the stepper mode may be used for long acceleration sequences (in the example of FIG. 12, up to 480 seconds, or 6 minutes), while the analog mode may be used for sequences less than about 24.49 seconds. The motion when using the stepper mode may be "jerky" since it occurs in discrete steps. If gravimeter 128 (Referring to FIG. 1) is able to respond to these impulses, package 310 (Referring to FIG. 3) may be isolated from shock so as to minimize the effect of the impulses.

In block 838, both the analog mode and the stepper mode provide confirmation that all acceleration sequences were completed, after which control is passed back to block 808 where the actuators module is in a wait state, waiting on commands from information handling system 114 (Referring to FIG. 1).

Figure 13:
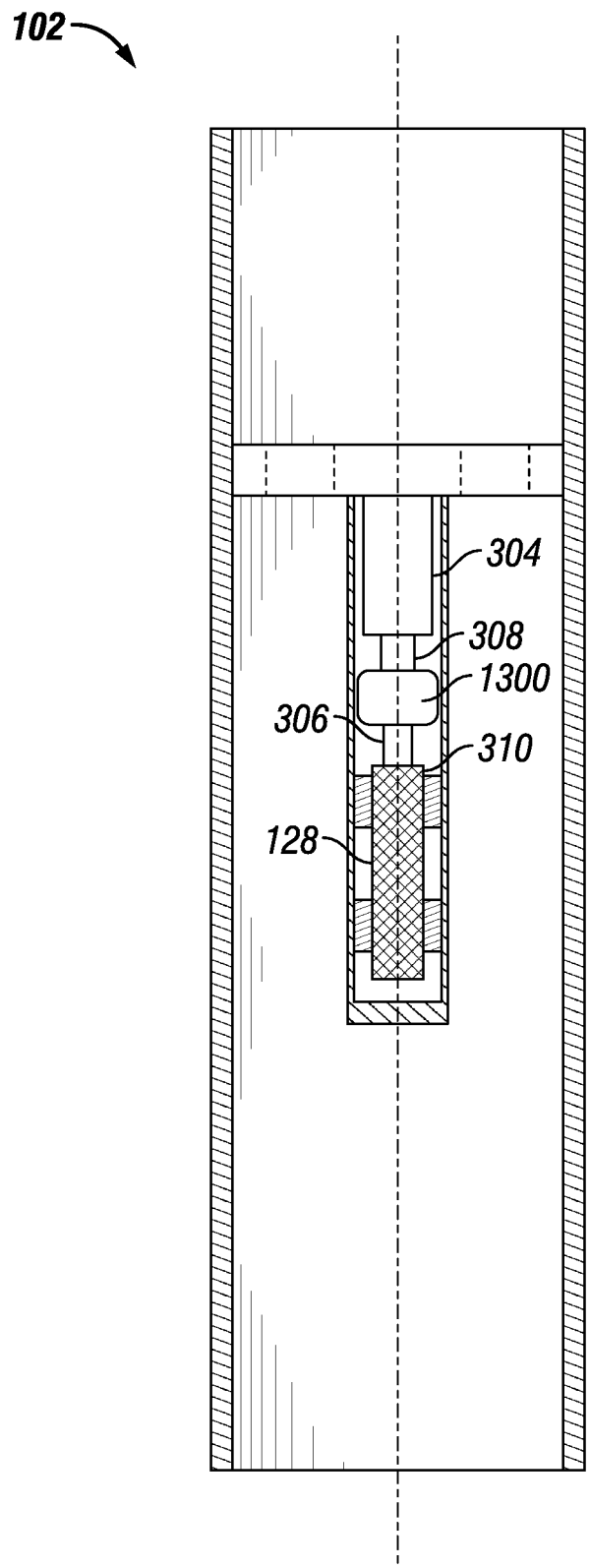
FIG. 13 illustrates another example of a downhole tool.

FIG. 13 illustrates an example of downhole tool 102, in which package 310 may rotate about its axis of symmetry as a part of the calibration. This may make it possible to calibrate out misalignments between a plurality of gravimeters 128 and the symmetry axis, and between individual gravimeters 128. In addition, it may make it possible to determine biases as well as scale factors. Shaft 308 of linear actuator 304 terminates in the housing of a rotary stepping motor 1300 instead of linkage 306 to package 310 containing gravimeter 128, which may be a three-axis gravimeter. The output of rotary stepping motor 1300 is connected via linkage 306 to package 310 containing gravimeter 128. In this way, linear motion along the axis of symmetry of package 310 as well as rotation about the axis of symmetry of package 310 may be affected.

Figure 14:
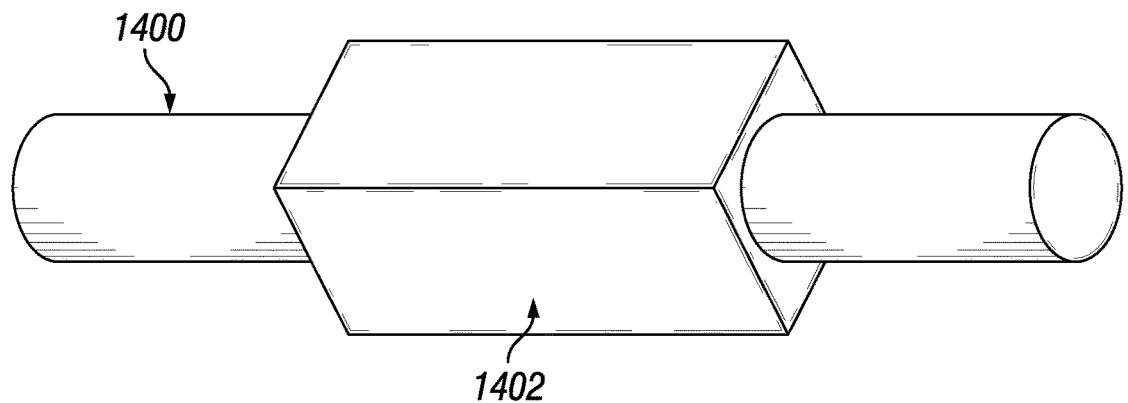
FIG. 14 illustrates linkage for connecting a stepper motor to the gravimeter.

Alternatively, rotary stepping motor 1300 may have a hollow shaft and a link extending from shaft 308 through the hollow shaft of rotary stepping motor 1300 and may be connected to package 310 of gravimeter 128. FIG. 14 illustrates how link 1400 from linear actuator 304 (Referring to FIG. 3) may be modified and hollow rotary shaft 1402 of rotary stepping motor 1300 (Referring to FIG. 13) may be modified so as to accommodate the modified portion of link 1400 from linear actuator 304 so as to make it possible to apply torque about the axis of symmetry of link 1400 from linear actuator 304. In this case, the part of linear actuator 304 extending from rotary stepping motor 1300 may have a cylindrical profile and rotary stepping motor 1300 may be able to accommodate the rotation of link 1400 to package 310 (Referring to FIG. 13). A square cross-section is illustrated in FIG. 14 for the portion of hollow rotary shaft 1402 that engages rotary stepping motor 1300. It should be noted that other cross-sections, such as triangular or hexagonal may be utilized.

An example of downhole tool 102 in FIG. 13 may encounter specific problems associated with determining a gravimeter bias. When determining a gravimeter bias, a more general performance model for the three-axis system of gravimeters may be written as seen below:

$$Gx = SFx*Vx + bx \quad (16)$$

$$Gy = SFy*Vy + by \quad (17)$$

$$Gz = SFz*Vz + bz \quad (18)$$

where the voltages output by the X-, Y- and Z-axis gravimeters (Vx, Vy, and Vz) are gravimeter voltage outputs corresponding to accelerations Gx, Gy and Gz. SFx, SFy and SFz are scale factors, and bx, by and bz are biases.

In particular, at a particular calibration station, the field values may be Gxs, Gys and Gzs with corresponding voltages Vxs, Vys and Vzs, measured when gravimeters 128 (Referring to FIG. 1) are stationary. As seen below:

$$Gxs = SFx*Vxs + bx \quad (19)$$

$$Gys = SFy*Vys + by \quad (20)$$

$$Gzs = SFz*Vzs + bz \quad (21)$$

After performing these measurements, acceleration a may be applied to linkage 306 between linear actuator 304 and package 310 (Referring to FIGS. 3 and 13). Taking into account the angles between the three gravimeter sense-axes, accelerations Gxa, Gya, Gza will result with measured voltages Vxa, Vya and Vza such that:

$$Gxa = SFx*Vxa + bx \qquad (22)$$

$$Gya = SFy*Vya + by \qquad (23)$$

$$Gza = SFz*Vza + bz \qquad (24)$$

where $$Gxa = Gxs + \frac{\alpha}{\sqrt{3}} \qquad (25)$$

$$Gya = Gys + \frac{\alpha}{\sqrt{3}} \qquad (26)$$

$$Gza = Gzs + \frac{\alpha}{\sqrt{3}} \qquad (27)$$

then $$SFx = \frac{\alpha}{\sqrt{3}*(Vxa - Vxs)} \qquad (28)$$

$$SFy = \frac{\alpha}{\sqrt{3}*(Vya - Vys)} \qquad (29)$$

$$SFz = \frac{\alpha}{\sqrt{3}*(Vza - Vzs)} \qquad (30)$$

The above identified equations may be obtained without knowing the gravitational field value at a measurement point. If the gravitational field value is known along each of the components of gravimeter 128 (Referring to FIG. 1), then the biases may be obtained. However, even if the total gravitational field value is known at the measurement point, this may not be sufficient to determine the individual components of the gravitational field as projected onto the three gravimeter sense-axes since the orientation of the sense-axes with respect to the local gravitational field is not known. Thus, only the scale factors may be determined with the first embodiment of this disclosure.

Figure 15:
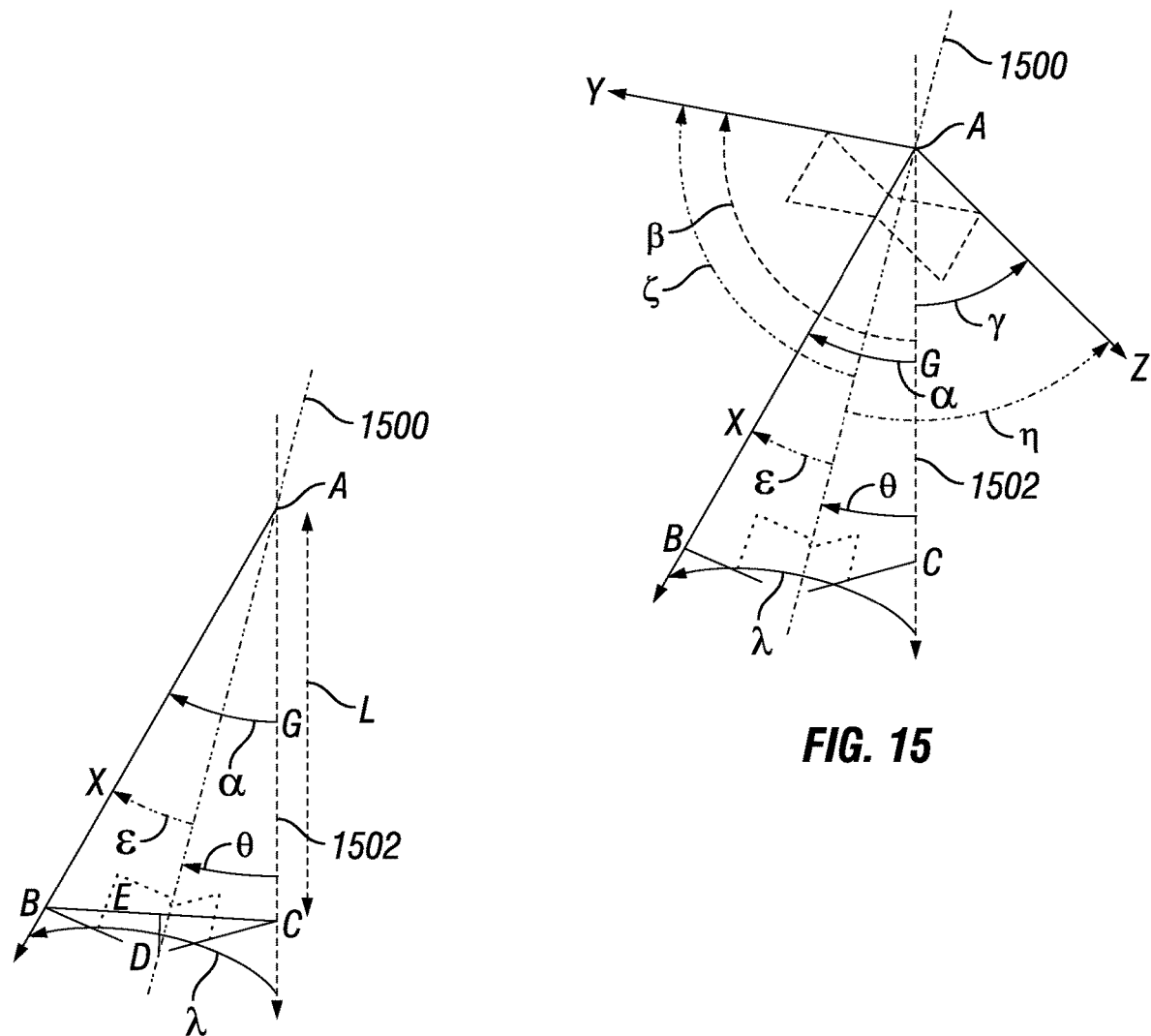
FIG. 15 illustrates a chart of a 3-axis gravimeter geometry.

A more general approach to calibration may also be utilized. With reference to FIG. 15, the X-, Y- and Z-axes represent the sense axes of the X, Y and Z gravimeter 128, tool-axis 1500, vertical 1502 (i.e. the direction of the gravitational field), the inclination, θ, is the angle between tool-axis 1500 and vertical 1502. The X-axis makes an angle α with respect to vertical 1502 and an angle ϵ with respect to tool-axis 1500. The Y-axis makes an angle β with respect to vertical 1502, and an angle ζ with respect to tool-axis 1500. The Z-axis makes an angle γ with respect to vertical 1502 and an angle η with respect to tool-axis 1500. Furthermore, the plane containing the X-axis and tool-axis 1500 makes an angle λ with respect to the plane containing vertical 1502 and tool-axis 1500.

Figure 16:
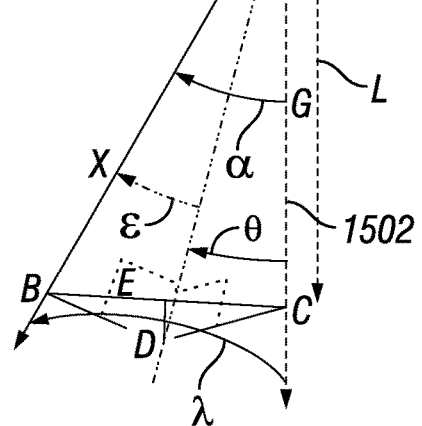
FIG. 16 illustrates a chart of tool axis.

Gravitation components, Gx, Gy and Gz may be defined in terms of the known angles θ, ϵ, ζ, η, and λ from the total gravitational field at a point of measurement, Gt. Note that the definition of λ is somewhat arbitrary, it has been chosen such that λ=0 when the X-axis is in the plane defined by tool-axis 1500 and vertical 1502. The triangle ABC of FIG. 15, is shown in FIG. 16 with more detail. A is the point of intersection between tool-axis 1500 and vertical 1502. The line AB is in the direction of the X-axis gravimeter's sense-axis. Point C is a second point on vertical 1502. Point D is obtained by dropping an orthogonal line from C to the tool axis. An orthogonal to the line AD is drawn from point D to the line AB and intersects the line at point B. Point E is the point of intersection of a line from point D drawn orthogonal to line BC. The following equation may be formed from the above identified as follows:

$$\cos(\alpha) = \cos(\epsilon)*\cos(\theta) + \cos(\lambda)*\sin(\epsilon)*\sin(\theta) \qquad (31)$$

The corresponding equations for the angles pertaining to the Y- and Z-axes may be obtained using symmetry and noting that for the Y-axis, $\lambda \rightarrow \lambda + 2\pi/3$, which will be defined as $\mu$, and $\epsilon \rightarrow \zeta$. For the Z-axis, $\lambda \rightarrow \lambda + 4\pi/3$, which will be defined as $\nu$, and $\epsilon \rightarrow \eta$. Additionally, $$\Phi \equiv \text{ArcCos}\left[\frac{1}{\sqrt{3}}\right],$$

this may be an angle between each sense-axis and tool-axis 1500 (Referring to FIGS. 15 and 16). In general, the angles between tool-axis 1500 and sense axes may differ from Φ. To account for this, define error terms δϵ, δζ and δη are introduced as follows.

$$\epsilon = \Phi + \delta\epsilon \qquad (32)$$

$$\zeta = \Phi + \delta\zeta \qquad (33)$$

$$\eta = \Phi + \delta\eta \qquad (34)$$

In addition, the angles λ, μ and ν may have errors. In order to take this into account, the following equations may be used:

$$\lambda = \Lambda + \delta\lambda \qquad (35)$$

$$\mu = \Lambda + 2\frac{\pi}{3} + \delta\mu \qquad (36)$$

$$\nu = \Lambda + 2\frac{\pi}{3} + \delta\nu \qquad (37)$$

where Λ is the angle between the plane containing tool-axis 1500 and the X-axis and the plane containing tool-axis 1500 and vertical 1502 (Referring to FIGS. 15 and 16), λ is the measured value of Λ and δλ is the error in the value used for Λ, with similar definitions for δμ and δν.

Assuming that all of the terms δϵ, δζ, δη, δλ, δν are small, and dropping terms above first order, the below equations may be formed:

$$Gx = \qquad (38)$$
$$Gt*(\text{Cos}[\theta]\text{Cos}[\Phi] + [\Lambda]\text{Sin}[\theta]\text{Sin}[\Phi] + \delta\epsilon(\text{Cos}[\Lambda]\text{Cos}[\Phi]\text{Sin}[\theta] - \text{Cos}[\theta]\text{Sin}[\Phi]) - \delta\lambda\text{Sin}[\theta]\text{Sin}[\Lambda]\text{Sin}[\Phi])$$

$$Gy = Gt*\left(\text{Cos}[\theta]\text{Cos}[\Phi] + \text{Cos}\left[\Lambda + 2\frac{\pi}{3}\right]\text{Sin}[\theta]\text{Sin}[\Phi] + \qquad (39)\right.$$
$$\delta\zeta\left(\text{Cos}\left[\Lambda + 2\frac{\pi}{3}\right]\text{Cos}[\Phi]\text{Sin}[\theta] - \text{Cos}[\theta]\text{Sin}[\Phi]\right) -$$
$$\left.\delta\mu\text{Sin}[\theta]\text{Sin}\left[\Lambda + 2\frac{\pi}{3}\right]\text{Sin}[\Phi]\right)$$

$$Gz = Gt * \big(\text{Cos}[\theta]\text{Cos}[\Phi] + \text{Cos}[\Lambda + 4\tfrac{\pi}{3}]\text{Sin}[\theta]\text{Sin}[\Phi] + \qquad (40)$$
$$\delta\eta(\text{Cos}[\Lambda + 4\tfrac{\pi}{3}]\text{Cos}[\Phi]\text{Sin}[\theta] - \text{Cos}[\theta]\text{Sin}[\Phi]) -$$
$$\delta v \text{Sin}[\theta]\text{Sin}[\Lambda + 4\tfrac{\pi}{3}]\text{Sin}[\Phi]\big)$$

Working only with the Gx component (the Gy and Gz components may be obtained using symmetry considerations), and retaining only first order terms, the following may be found:

$$Gx = Gt * \big(\text{Cos}[\theta]\text{Cos}[\Phi] + \text{Sin}[\theta] * \text{Sin}[\Phi + v] * \text{Cos}[\Lambda] - \qquad (41)$$
$$\sqrt{\delta \epsilon 2 + \delta\lambda^2 * \text{Sin}[\Lambda]^2} * \text{Sin}[\theta + \chi] * \text{Sin}[\Phi]\big)$$

$$\frac{Gx}{Gt} = \qquad (42)$$
$$\sqrt{\tfrac{2}{3}} * \text{Sin}[\theta]\text{Cos}[\Lambda + \Omega]\left(1 + \frac{6\epsilon}{\sqrt{2}}\right) + \frac{\text{Cos}[\theta]}{\sqrt{3}} - \delta\epsilon\sqrt{\tfrac{2}{3}} * \text{Cos}[\theta]$$

Where $$\text{Cos}[\Omega] \equiv \frac{\text{Sin}[\theta] * (\text{Sin}[\Phi] + \delta\epsilon * \text{Cos}[\Phi])}{\sqrt{(\text{Sin}[\theta] * (\text{Sin}[\Phi] + \delta\epsilon * \text{Cos}[\Phi]))^2 + (\delta\lambda\text{Sin}[\theta]\text{Sin}[\Phi])^2}} \qquad (43)$$

$$\text{Sin}[\Omega] \equiv \frac{\delta\lambda\text{Sin}[\theta]\text{Sin}[\Phi]}{\sqrt{(\text{Sin}[\theta] * (\text{Sin}[\Phi] + \delta\epsilon * \text{Cos}[\Phi]))^2 + (\delta\lambda\text{Sin}[\theta]\text{Sin}[\Phi])^2}} \qquad (44)$$

Inserting the value of 0 and continuing the simplification to first order, $$\text{Sin}[\Omega] = \delta\lambda \qquad (45)$$
$$\text{Cos}[\Omega] = 1 \qquad (46)$$

$$\frac{Gx}{Gt} = \qquad (47)$$
$$\sqrt{\tfrac{2}{3}} * \text{Sin}[\theta](\text{Cos}[\Lambda] - \text{Sin}[\Lambda]\delta\lambda)\left(1 + \frac{\delta\epsilon}{\sqrt{2}}\right) + \frac{\text{Cos}[\theta]}{\sqrt{3}} * (1 - \sqrt{2}\,\delta\epsilon)$$

Similarly $$\frac{Gy}{Gt} = \sqrt{\tfrac{2}{3}} * \text{Sin}[\theta](\text{Cos}[\Lambda + 2\tfrac{\pi}{3}] - \text{Sin}[\Lambda + 2\tfrac{\pi}{3}]\delta\mu)\left(1 + \frac{\delta\zeta}{\sqrt{2}}\right) + \qquad (48)$$
$$\frac{\text{Cos}[\theta]}{\sqrt{3}} - \delta\zeta\sqrt{\tfrac{2}{3}} * \text{Cos}[\theta]$$

$$\frac{Gz}{Gt} = \sqrt{\tfrac{2}{3}} * \text{Sin}[\theta](\text{Cos}[\Lambda + 4\tfrac{\pi}{3}] - \text{Sin}[\Lambda + 4\tfrac{\pi}{3}]\delta v)\left(1 + \frac{\delta\eta}{\sqrt{2}}\right) + \qquad (49)$$
$$\frac{\text{Cos}[\theta]}{\sqrt{3}} - \delta\eta\sqrt{\tfrac{2}{3}} * \text{Cos}[\theta]$$

The equations above work to find geometric effects. Instrumental effects may also be taken into account. It may be assumed that there is no internal (e.g., electrical) coupling between the X- and Y- sensors, between the X- and Z-sensors and between the Y- and Z-sensors. All other couplings may be due to misalignment and taken into account. Each gravimeter 128 (Referring to FIG. 1) may have an instrumental scale factor error and an instrumental bias error. Bias may always be present and cross-terms have already been accounted for, the above equations may be generalized as follows:

$$Gx = Gt * Sx * \qquad (50)$$
$$\left(\sqrt{\tfrac{2}{3}} * \text{Sin}[\theta](\text{Cos}[\Lambda] - \text{Sin}[\Lambda]\delta\lambda)\left(1 + \frac{\delta\epsilon}{\sqrt{2}}\right) + \frac{\text{Cos}[\theta]}{\sqrt{3}} - \delta\epsilon\sqrt{\tfrac{2}{3}} * \text{Cos}[\theta]\right) + bx$$

$$Gy = Gt * Sy * \left(\sqrt{\tfrac{2}{3}} * \text{Sin}[\theta](\text{Cos}[\Lambda + 2\tfrac{\pi}{3}] - \text{Sin}[\Lambda + 2\tfrac{\pi}{3}]\delta\mu)\left(1 + \frac{\delta\zeta}{\sqrt{2}}\right) + \qquad (51)$$
$$\frac{\text{Cos}[\theta]}{\sqrt{3}} - \delta\zeta\sqrt{\tfrac{2}{3}} * \text{Cos}[\theta]\right) + by$$

$$Gz = Gt * Sz * \left(\sqrt{\tfrac{2}{3}} * \text{Sin}[\theta](\text{Cos}[\Lambda + 4\tfrac{\pi}{3}] - \text{Sin}[\Lambda + 4\tfrac{\pi}{3}]\delta v)\left(1 + \frac{\delta\eta}{\sqrt{2}}\right) + \qquad (52)$$
$$\frac{\text{Cos}[\theta]}{\sqrt{3}} - \delta\eta\sqrt{\tfrac{2}{3}} * \text{Cos}[\theta]\right) + bz$$

Where Sx, Sy and Sz are scale factors such as 1, and bx, by and bz are biases, such as 0.

If Gx is measured as Λ is varied while 0 is kept constant (as e.g. if package 310 (Referring to FIG. 3) is held at a fixed location within the borehole and no linear acceleration is applied through the calibrator mechanism), then a plot of Gx vs. Λ results in a phase-shifted sine wave. Using linear regression techniques, the phase shift δλ may be determined. The amplitude of the sine wave is Gt*U where:

$$U \equiv Sx * \left(1 + \frac{\delta\epsilon}{\sqrt{2}}\right) \quad (53)$$

and an effective (not a true) bias may be determined as follows:

$$Gt * \frac{Sx}{\sqrt{3}} * \cos[\theta](1 - \sqrt{2} * \delta\epsilon) + bx \quad (54)$$

Even if Gt is known, there is not enough information to determine Sx, $\delta\epsilon$ and bx.

The local acceleration may be modulated by applying an acceleration, $\alpha$, along the tool-axis using linear actuator 304 (Referring to FIG. 3). Using a prime (i.e. ') to designate the resulting acceleration at a particular value of $\Lambda$ and at a particular inclination, $\theta$, the following may be formulated:

$$Gx[\Lambda]' = Gt * Sx * \sqrt{\frac{2}{3}} * \sin[\theta] * \left(1 + \frac{\delta\epsilon}{\sqrt{2}}\right) * \cos[\Lambda + \delta\Lambda] + \\ Gt * \frac{Sx}{\sqrt{3}} * \cos[\theta](1 - \sqrt{2} * \delta\epsilon) + bx + \alpha * \frac{Sx}{3} * (1 - \sqrt{2} * \delta\epsilon) \quad (55)$$

The overall scale factor was determined previously. Since a is known, it may possible to determine:

$$\frac{Sx}{\sqrt{3}} * (1 - \sqrt{2} * \delta\epsilon) \equiv V \quad (56)$$

so that $Gx[\Lambda]$ can be rewritten as:

$$Gx[\Lambda] = \sqrt{\frac{2}{3}} * \sin[\theta] * \cos[\Lambda + \delta\Lambda] * U * Gt + \cos[\theta] * V * Gt + bx \quad (57)$$

If Gt is known at the calibration point (as is sometimes the case), U and V may be determined, and from this, Sx and $\delta\epsilon$. As a result, bx can also be determined.

Further improvements are possible if measurements may be made at multiple inclinations. At a fixed inclination, $Gt*V*\cos[\theta]+bx$ acts an effective bias term (i.e it is not a function of $\Lambda$). If Gt is known at another inclination, $\theta_2$ (call this value $Gt_2$, and call the first inclination $\theta_1$ and the corresponding gravitational acceleration $Gt_1$, the following may be found:

$$Gx[\Lambda, \theta_1] = \quad (58)$$
$$\sqrt{\frac{2}{3}} * \sin[\theta_1] * \cos[\Lambda + \delta\Lambda] * U * Gt_1 + \cos[\theta_1] * V * Gt_1 + bx$$

$$Gx[\Lambda, \theta_2] = \quad (59)$$
$$\sqrt{\frac{2}{3}} * \sin[\theta_2] * \cos[\Lambda + \delta\Lambda] * U * Gt_2 + \cos[\theta_2] * V * Gt_2 + bx$$

As before, taking measurements at multiple values of $\Lambda$ and carrying out linear regressions on $\Lambda$, it may be obtained:

$$\sqrt{\frac{2}{3}} * \sin[\theta_1] * U * Gt_1 \quad (60)$$

and $$\sqrt{\frac{2}{3}} * \sin[\theta_2] * U * Gt_2 \quad (61)$$

from which it may be determine:

$$U*(Gt_2 - Gt_1) \quad (62)$$

One may also determine bx via algebraic solution, or if measurements are made at more than two values of inclination, $\theta$, via regression techniques. It is also possible to obtain V. Note that the first term, the multiplier of $\cos[\Lambda+\delta\Lambda]$ is obtained using a regression on $\Lambda$. If Gt is known at n points with different inclination values, then one can either solve for V with n regressions and averaging the results, or a more general regression involving $\Lambda$ and $\theta$ may be used. In addition, it is possible to determine $Gt_1*V$ and $Gt_2*V$ and hence it is possible to determine $V*(Gt_2-Gt_1)$.

Therefore, even if neither $Gt_1$ nor $Gt_2$ are known, but the change in the field, $Gt_2-Gt_1$ is known U and V may be solved for, which makes it possible to determine Sx and $\delta\epsilon$. Hence, by using measurements at multiple inclinations with a known difference in the field value, it may be possible to determine all of the calibration coefficients.

Note that the value of $\theta$ may not be known precisely. If values of Gx are determined at very low inclinations, the values of U may be in error by as much as a factor of $$\frac{\delta\theta}{\theta},$$

while there will be relatively little error in V ($\delta\theta$ is the error in the inclination). Similarly, at inclinations near 90° ( $$\frac{\pi}{2}$$

in radian measure), there will be relatively little error in U obtained in this way, while errors in V may be on the order of a factor of $$\frac{\delta\theta}{\frac{\pi}{2} - \theta}.$$

Hence, it is best to include a wide range of inclinations when using this approach to calibration, with at least one inclination between 10° and 80°.

Thus, by modulating the local gravitational acceleration using linear actuator 304 (Referring to FIG. 3), by making measurements at a plurality of values of $\Lambda$ and by carrying out the measurements at two or more inclinations, it is possible to provide a complete calibration of downhole tool 102 for measuring gravitational gradients. In examples, the inclination and $\Lambda$ are held constant while the gravitational field is measured with linear actuator 304 stationary, and then measured again while linear actuator 304 provides a modulation of a to the local acceleration. After this, package 310 (Referring to FIG. 3) is rotated to a new value of $\Lambda$ at a fixed inclination and another set of stationary measurements is made followed by measurements in which the gravitational field is modulated by α. This is repeated until measurements have been made at a suitable number of values of Λ, typically eight values, separated by about $$\frac{\pi}{4}$$

(radians) or 45°. After this, measurements are repeated at one or more inclinations (the same values of A need not be used at each inclination). Preferably, and where the volume of data allows, linear regression techniques are used in determining the calibration coefficients.

Because of the resulting symmetry, the configuration in which all three sense-axes make the same angle, ArcCos(1/sqrt(3)) with the symmetry axis of downhole tool 102, however, other relative orientations of the sense-axes may be utilized. It should also be noted that although a three-axis gravimeter is used in the preferred embodiment, a single-axis, or a dual-axis gravimeter can also be used since the rotation about the tool-axis makes it possible for a single sensor to perform all of the necessary measurements.

This method and system may include any of the various features of the compositions, methods, and system disclosed herein, including one or more of the following statements.

Statement 1: A method for in-situ calibration of a gravimeter comprising: disposing a downhole tool in a borehole, wherein the downhole tool comprises the gravimeter attached to a linear actuator; recording a first set of measurements with the gravimeter while the linear actuator is stationary; activating the linear actuator to cause the gravimeter to move linearly; recording a second set of measurements with the gravimeter; and calibrating the gravimeter based on the first and second set of recorded measurements.

Statement 2: The method of statement 1, further comprising activating an acceleration sequence for the linear actuator in an analog mode.

Statement 3: The method of statement 1 or 2, further comprising producing waveforms for the analog mode and energizing the linear actuator using the waveforms.

Statement 4: The method of any previous statement, further comprising sending confirmation to the information handling system that the acceleration sequence is complete.

Statement 5: The method of any previous statement, further comprising activating an acceleration sequence for the linear actuator in a stepper mode.

Statement 6: The method of any previous statement, further comprising producing a series and timing command for the stepper mode and energizing the linear actuator using the series and timing command.

Statement 7: The method of any previous statement, further comprising sending confirmation to the information handling system that the acceleration sequence is complete.

Statement 8: The method of any previous statement, wherein the recording a first set of measurements with the gravimeter while the linear actuator is stationary comprises a time delay to allow the gravimeter to be powered and stabilized.

Statement 9: The method of any previous statement, further comprising specifying a calibration parameter.

Statement 10: The method of any previous statement, wherein the calibration parameter is a number of constant acceleration intervals, a magnitude and sign of acceleration for each interval, an acceleration sample rate, or an acceleration to be produced in an analog mode or a stepper mode.

Statement 11: The method of any previous statement, further comprising rotating the gravimeter and measuring a bias.

Statement 12: A system comprising: a downhole tool, wherein the downhole tool comprises: a hanger; a sonde, is connected to the hanger; a linear actuator, connected to the hanger; a shaft, connected to the linear actuator; a linkage, connected to the shaft; a package, connected to the linkage; and a gravimeter, disposed in the package; a conveyance, attached to the downhole tool; and an information handling system, wherein the information handling system is in signal communication with the downhole tool, and configured to initiate a calibration sequence, send commands to a linear actuator module and a gravimeter module, record a first set of measurements while the linear actuator is stationary; activate the linear actuator; record a second set of measurement while the linear actuator is moving; calibrate the gravimeter based on the first and second set of recorded measurements; and store the calibration results.

Statement 13: The system of statement 12, wherein the information handling system is configured to activate an acceleration sequence for the linear actuator in an analog mode.

Statement 14: The system of statement 12 or statement 13, wherein the information handling system is configured to produce waveforms for the analog mode and energizing the linear actuator using the waveforms.

Statement 15: The system of statement 12-statement 14, wherein the information handling system is configured to send confirmation to the information handling system that the acceleration sequence is complete.

Statement 16: The system of statement 12-statement 16, wherein the information handling system is configured to activate an acceleration sequence for the linear actuator in a stepper mode.

Statement 17: The system of statement 12-statement 17, wherein the information handling system is configured to produce a series and timing command for the stepper mode and energizing the linear actuator using the series and timing command.

Statement 18: The system of statement 12-statement 18, wherein the information handling system is configured to send confirmation to the information handling system that the acceleration sequence is complete.

Statement 19: The system of statement 12-statement 19, wherein gravimeter is a three axis gravimeter.

Statement 20: The system of statement 12-statement 20, further comprising a plurality of gravimeters.

Statement 21: A downhole tool, wherein the downhole tool comprises: a hanger; a sonde, connected to the hanger; a linear actuator, connected to the hanger; a shaft, connected to the linear actuator; a linkage, connected to the shaft; a package, connected to the linkage; and a gravimeter, disposed in the package.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for in-situ calibration of a gravimeter, comprising:
    disposing a downhole tool in a borehole, wherein the downhole tool comprises the gravimeter attached to a linear actuator, wherein the linear actuator is configured to drive axial movement of the gravimeter, and wherein the downhole tool further comprises a plurality of springs configured to restrain lateral movement of the gravimeter;
    recording a first set of measurements with the gravimeter while the linear actuator is stationary;
    activating the linear actuator to cause the gravimeter to move axially;
    recording a second set of measurements with the gravimeter; and
    calibrating the gravimeter based on the first and second set of recorded measurements.

2. The method of claim 1, further comprising activating an acceleration sequence for the linear actuator in an analog mode.

3. The method of claim 2, further comprising producing waveforms for the analog mode and energizing the linear actuator using the waveforms.

4. The method of claim 3, further comprising sending confirmation to the information handling system that the acceleration sequence is complete.

5. The method of claim 1, further comprising activating an acceleration sequence for the linear actuator in a stepper mode.

6. The method of claim 5, further comprising producing a series and timing command for the stepper mode and energizing the linear actuator using the series and timing command.

7. The method of claim 6, further comprising sending confirmation to the information handling system that the acceleration sequence is complete.

8. The method of claim 1, wherein the recording a first set of measurements with the gravimeter while the linear actuator is stationary comprises a time delay to allow the gravimeter to be powered and stabilized.

9. The method of claim 1, further comprising specifying a calibration parameter.

10. The method of claim 9, wherein the calibration parameter is a number of constant acceleration intervals, a magnitude and sign of acceleration for each interval, an acceleration sample rate, or an acceleration to be produced in an analog mode or a stepper mode.

11. The method of claim 1, further comprising rotating the gravimeter and measuring a bias.

12. A system comprising:
    a downhole tool, wherein the downhole tool comprises:
        a hanger;
        a sonde connected to the hanger;
        a linear actuator disposed within the sonde and having a proximal end connected to the hanger;
        a shaft extending from a distal end of the linear actuator;
        a package connected to the shaft via a linkage, wherein activating the linear actuator is configured to extend and retract the shaft along a central axis of the sonde to drive axial movement of the package;
        a gravimeter disposed in the package such that axial movement of the package moves the gravimeter axially; and
        a plurality of springs disposed within the sonde and configured to restrain lateral movement of the package such that lateral movement of the gravimeter is restrained;
    a conveyance attached to the downhole tool; and
    an information handling system, wherein the information handling system is in signal communication with the downhole tool, and configured to initiate a calibration sequence, send commands to a linear actuator module and a gravimeter module, record a first set of measurements while the linear actuator is stationary; activate the linear actuator; record a second set of measurement while the linear actuator is moving; calibrate the gravimeter based on the first and second set of recorded measurements; and store the calibration results.

13. The system of claim 12, wherein the information handling system is configured to activate an acceleration sequence for the linear actuator in an analog mode.

14. The system of claim 13, wherein the information handling system is configured to produce waveforms for the analog mode and energizing the linear actuator using the waveforms.

15. The system of claim 14, wherein the information handling system is configured to send confirmation to the information handling system that the acceleration sequence is complete.

16. The system of claim 12, wherein the information handling system is configured to activate an acceleration sequence for the linear actuator in a stepper mode.

17. The system of claim 16, wherein the information handling system is configured to produce a series and timing command for the stepper mode and energizing the linear actuator using the series and timing command.

18. The system of claim 17, wherein the information handling system is configured to send confirmation to the information handling system that the acceleration sequence is complete.

19. The system of claim 12, wherein gravimeter is a three axis gravimeter.

20. The system of claim 12, further comprising a plurality of gravimeters.

21. A downhole tool, wherein the downhole tool comprises:
 a hanger;
 a sonde connected to the hanger;
 a linear actuator disposed within the sonde and having a proximal end connected to the hanger;
 a shaft extending from a distal end of the linear actuator;
 a package connected to the shaft via a linkage, wherein activating the linear actuator is configured to extend and retract the shaft along a central axis of the sonde to drive axial movement of the package; and
 a gravimeter disposed in the package such that axial movement of the package moves the gravimeter axially;
 a plurality of springs disposed within the sonde and configured to restrain lateral movement of the package such that lateral movement of the gravimeter is restrained.

* * * * *

UNITED STATES PATENT AND TRADEMARK OFFICE
CERTIFICATE OF CORRECTION

PATENT NO. : 11,525,941 B2  
APPLICATION NO. : 16/957009  
DATED : December 13, 2022  
INVENTOR(S) : Paul F. Rodney and Daniel Joshua Stark Page 1 of 1

It is certified that error appears in the above-identified patent and that said Letters Patent is hereby corrected as shown below:

In the Specification

Column 16, equation 38, please replace with
"Gx = Gt * (Cos[$\theta$]Cos[$\Phi$] + Cos[$\Lambda$]Sin[$\theta$]Sin[$\Phi$] + $\delta\epsilon$(Cos[$\Lambda$]Cos[$\Phi$]Sin[$\theta$]
 − Cos[$\theta$]Sin[$\Phi$]) − $\delta\lambda$Sin[$\theta$]Sin[$\Lambda$]Sin[$\Phi$]) (38)"

Column 17, equation 41, please replace with $$\text{Gx} = \text{Gt} * (\text{Cos}[\theta]\text{Cos}[\Phi] + \text{Sin}[\theta] * \text{Sin}[\phi + \upsilon] * \text{Cos}[\Lambda] - \sqrt{\delta\epsilon^2 + \delta\lambda^2 * \text{Sin}[\Lambda]^2} * \text{Sin}[\theta + \chi] * \text{Sin}[\Phi]) \quad (41)$$

Column 17, equation 42, please replace with $$\frac{\text{Gx}}{\text{Gt}} = \sqrt{\frac{2}{3}} * \text{Sin}[\theta]\text{Cos}[\Lambda + \Omega](1 + \frac{\delta\epsilon}{\sqrt{2}}) + \frac{\text{Cos}[\theta]}{\sqrt{3}} - \delta\epsilon\sqrt{\frac{2}{3}} * \text{Cos}[\theta] \quad (42)$$

Column 17, Line 60, please replace --0-- with "$\Phi$"

Signed and Sealed this  
Twenty-first Day of February, 2023

Katherine Kelly Vidal  
*Director of the United States Patent and Trademark Office*